United States Patent [19]

Kielma et al.

[11] 4,306,350

[45] Dec. 22, 1981

[54] AUTOMATIC TOOL CHANGER AND TOOL STORAGE ARRANGEMENT FOR MACHINE TOOL

[75] Inventors: Ervin J. Kielma, West Allis; Frank E. Dailey, Milwaukee, both of Wis.

[73] Assignee: Kearney & Trecker Corporation, West Allis, Wis.

[21] Appl. No.: 149,124

[22] Filed: May 12, 1980

[51] Int. Cl.³ .............................................. B23Q 3/157
[52] U.S. Cl. .................................... 29/568; 29/426.3; 211/1.5
[58] Field of Search .................... 29/568, 26 A, 426.3, 29/466; 211/1.5

[56] References Cited

U.S. PATENT DOCUMENTS 3,762,036 10/1973 Goebel et al. ........................ 29/568

*Primary Examiner*—Bilinsky Z. R.
*Attorney, Agent, or Firm*—Cyril M. Hajewski; Robert B. Levy

[57] ABSTRACT

A combined tool storage and tool change arrangement for use with a machine tool of the type which includes a power driven rotatable spindle having a socket which receives a tool shank of a predetermined size. The tool storage arrangement comprises a main tool storage magazine with a plurality of tool receiving sockets sized to respectively receive a tool having a shank of said predetermined size. Means is provided for moving the main tool storage magazine whereby to present a predetermined tool receiving socket and the tool therein to a first tool transfer point. An auxiliary tool storage magazine is provided for receiving and storing a plurality of tools having shanks of a different size than said predetermined size. The auxiliary tool storage magazine has a shank of said predetermined size whereby the auxiliary tool storage magazine may be stored in a socket of the main tool storage magazine. Means is provided for transferring a predetermined tool storage magazine having a desired assortment of tools thereon from the main tool storage magazine to a tool transfer station contiguous the spindle of the machine tool. A tool transfer means is provided for transferring the predetermined tool from the auxiliary tool storage magazine to the spindle of the machine tool.

16 Claims, 25 Drawing Figures

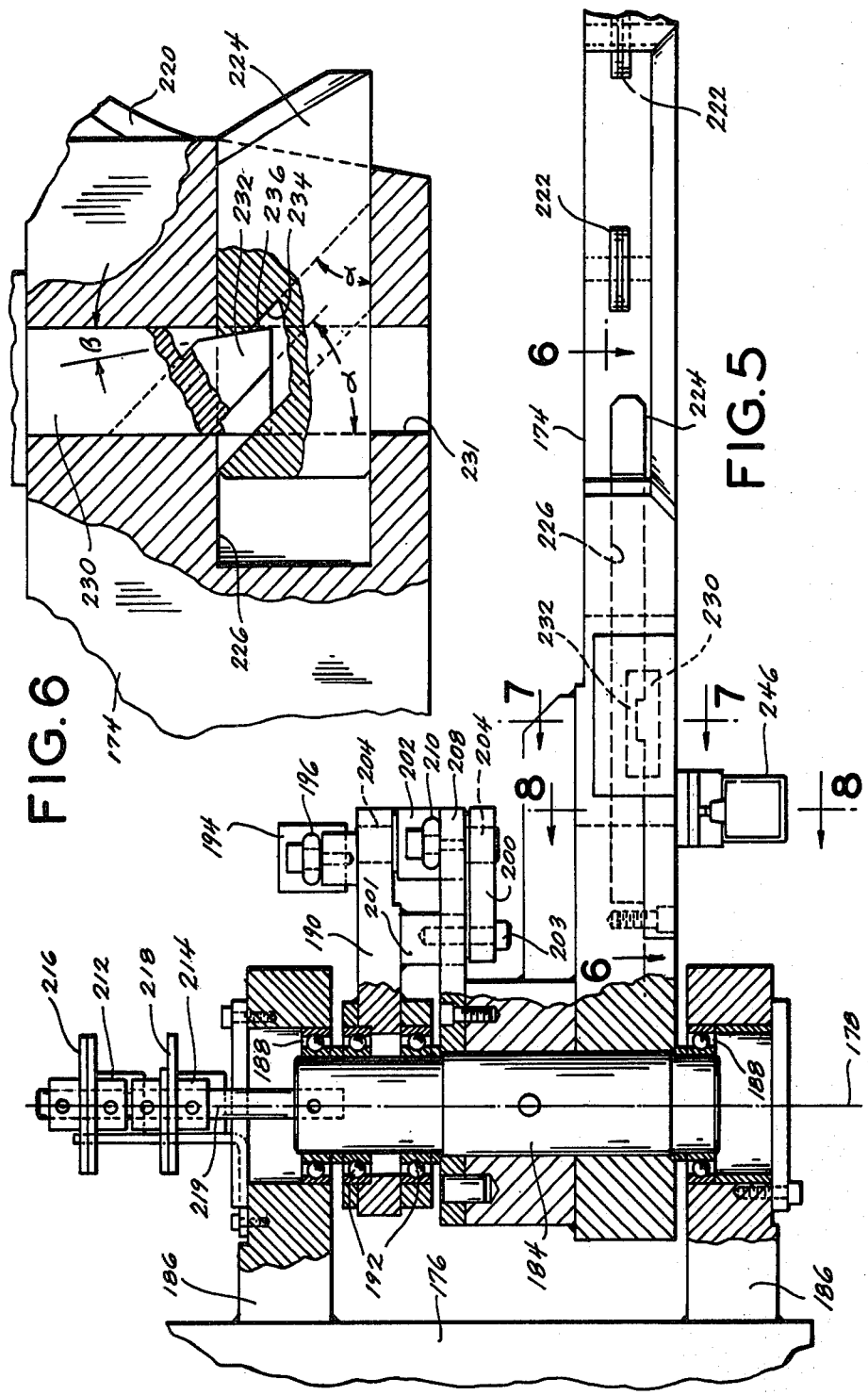

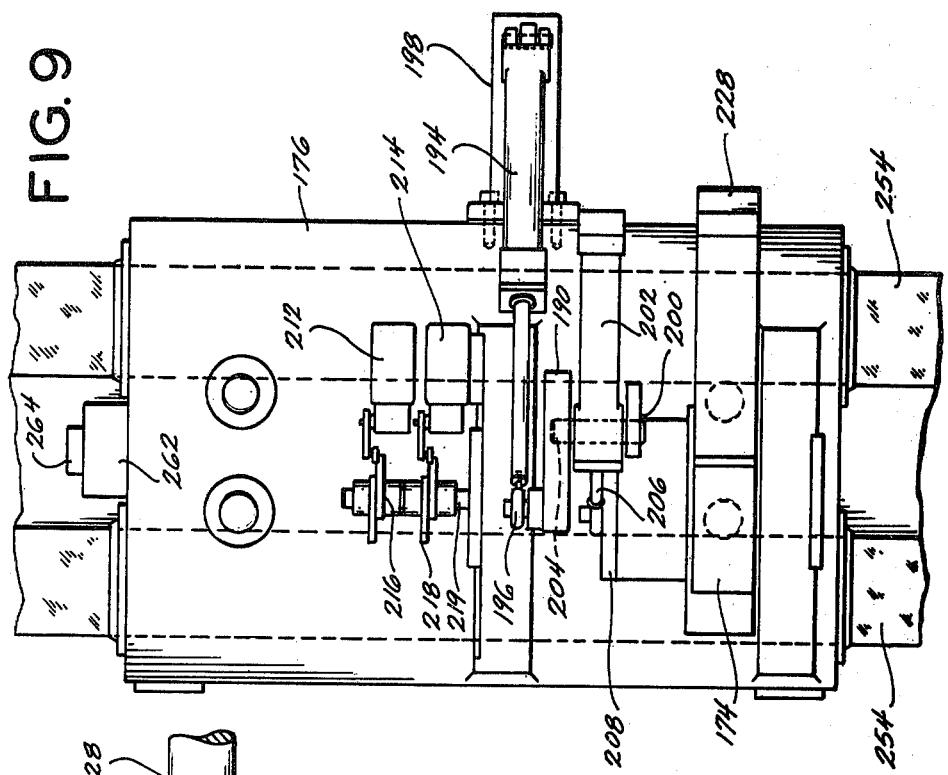
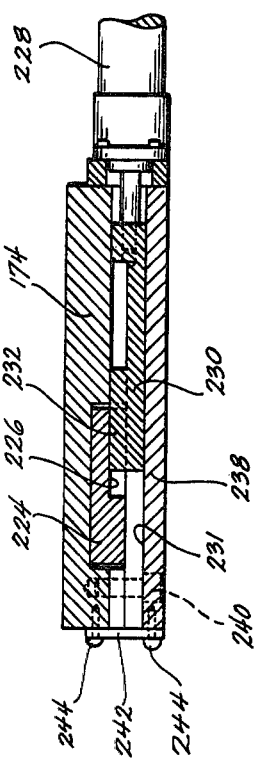

FIG. 10
FIG. 11
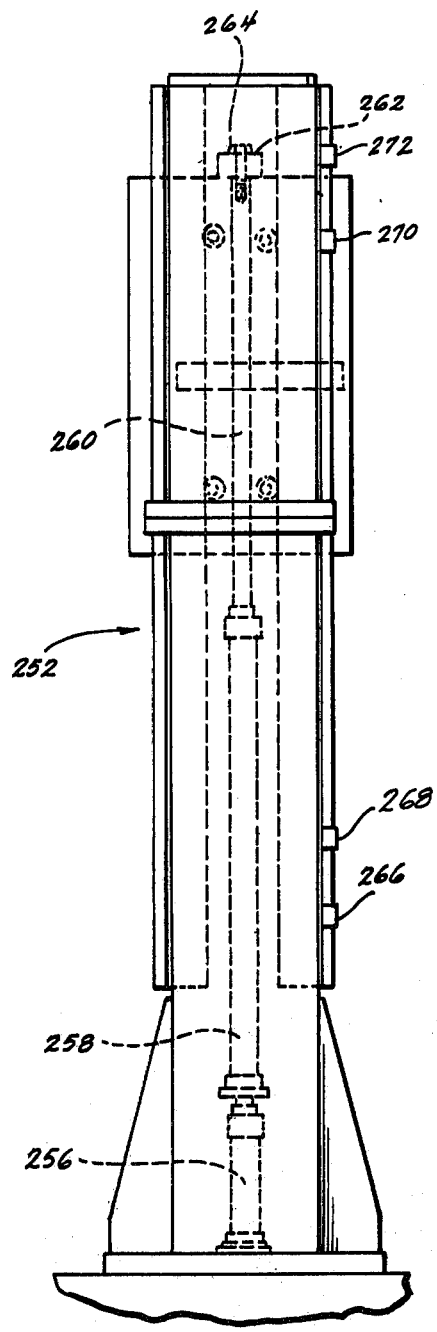
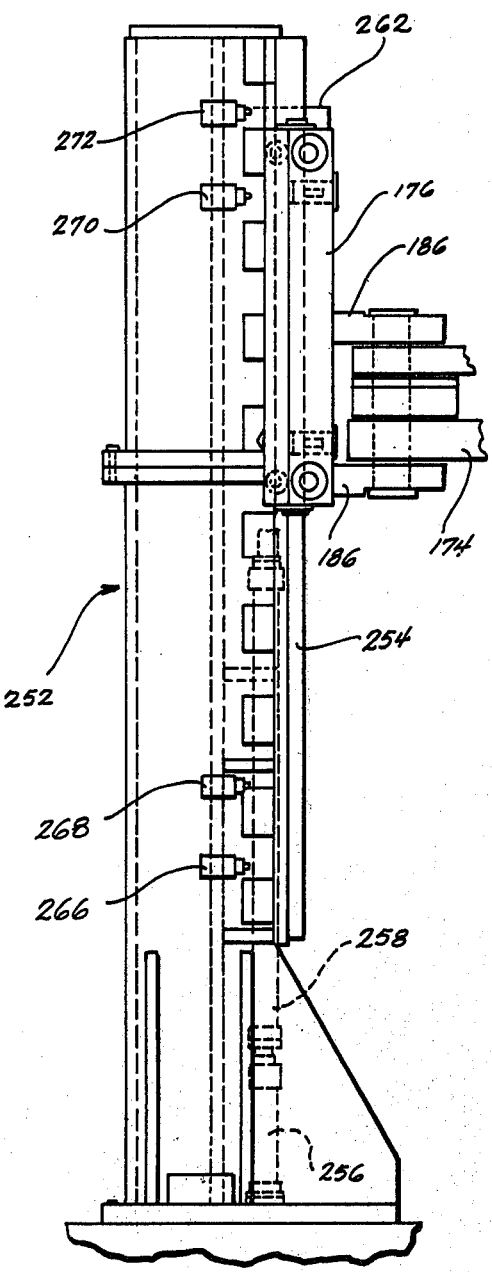

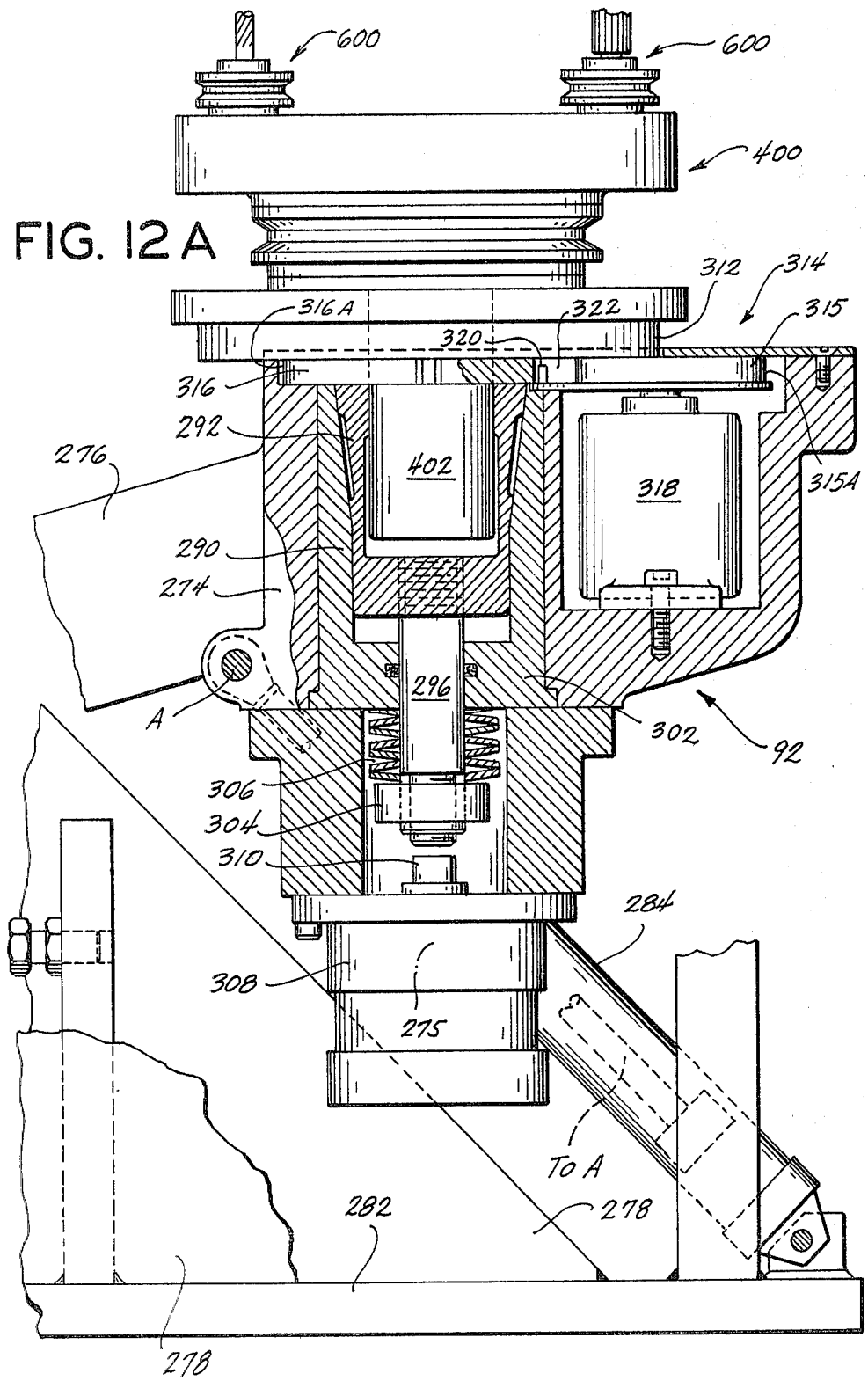

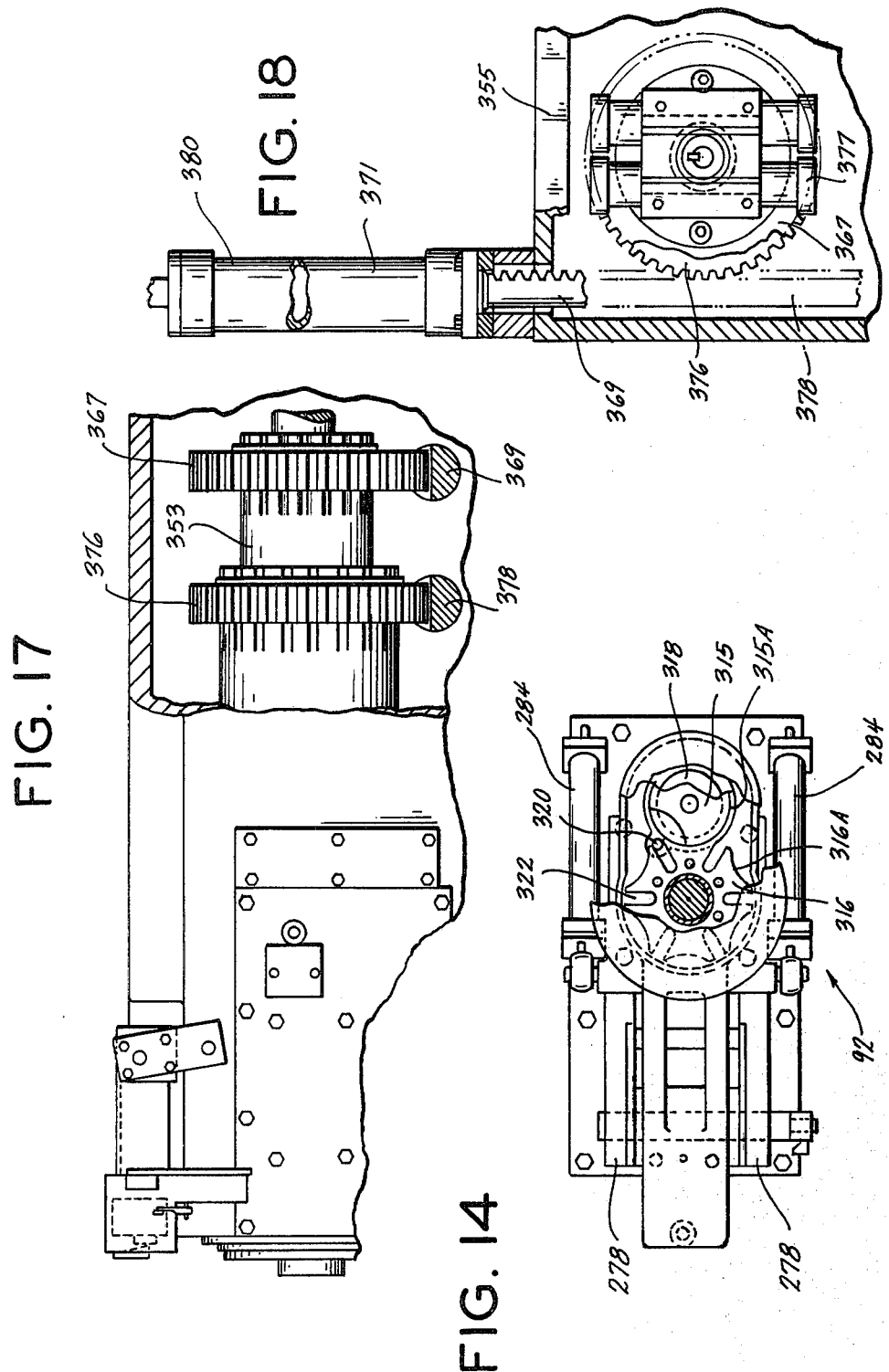

AUTOMATIC TOOL CHANGER AND TOOL STORAGE ARRANGEMENT FOR MACHINE TOOL

BACKGROUND OF THE INVENTION

This invention relates to automatic tool changers for machine tools, to an improved tool storage arrangement for such automatic tool changers, and to an improved method of storing and transferring tools for machine tools.

DESCRIPTION OF THE PRIOR ART

In the past, many different types of automatic tool changers for machine tools have been known, such as, for example, those shown by U.S. Pat. No. 3,760,491, issued to Frank Zankl et al on Sept. 25, 1973; U.S. Pat. No. 4,087,901, issued to Earl R. Lohneis et al on May 9, 1978; and, U.S. Pat. No. 4,164,290, issued to Frank Zankl on Aug. 14, 1979.

Another automatic tool changer for machine tools, which has certain features in common with the automatic tool changer of the present invention, is shown by U.S. Patent Application Ser. No. 954,438, filed Oct. 25, 1978, and assigned to the same assignee as the present application. The usual practice in the prior art is to provide in association with the automatic tool changer a tool storage magazine for storing a plurality of tools which may be used during various operations performed by the machine tool. Typically, such a tool storage magazine may store seventy tools, and the tool storage magazine is indexed by a numerical program control to position at a tool transfer point the various tools required by the machine tool in operating on a workpiece.

It is often desirable to be able to store tools having different shank sizes or diameters in the tool storage magazine. Thus, many larger tools have relatively large shanks, such as, for example, four inch diameter cylindrical shanks, while other tools which it may be desired to store in the magazine are much smaller and have correspondingly smaller tool shanks, such as, for example, #50 taper shanks. The sockets of the tool storage magazine are all sized to receive the shanks of the larger tools, and hence, when it was desired in the prior art to store smaller tools having smaller tool shanks in the same tool magazine, it was necessary to provide an adapter on the shank of each of the small tools in order to adapt the shank of the small tool to be received in the sockets of the tool magazine. When the small tools are stored in the tool magazine using adapters on the shanks thereof, as just explained, only one small tool may be stored in a given tool receiving socket of the tool magazine, with the small tool having the adapter on the shank thereof occupying the same storage space in the tool magazine as a large tool. Hence, if there are a large number of small tools to be stored in the same tool storage magazine which also receives the larger tools, a substantial portion of the available storage space of the tool magazine may be occupied by the small tools, which is an inefficient use of the tool storage magazine. However, prior to the present invention, no solution has been provided for this inefficient utilization of the storage space of the tool magazine when storing small tools in a tool magazine which is essentially intended for use in storing larger tools.

SUMMARY OF THE INVENTION

Accordingly, it is an object of the present invention to provide an improved tool storage arrangement for use in conjunction with an automatic tool changer for a machine tool.

It is a further object of the invention to provide an improved tool storage arrangement for use in conjunction with an automatic tool changer for machine tools in which the tool storage arrangement is more efficient and provides a significantly increased tool storage capacity as compared to prior art tool storage arrangements for use with automatic tool changers for machine tools.

It is a further object of the present invention to provide a tool storage arrangement for use with automatic tool changers for machine tools in which the tool storage arrangement is adapted to store tools having shanks of different peripheral sizes of diameters with significantly improved space utilization, and with significantly increased tool storage capacity for a given size tool storage facility than in prior art tool storage arrangements.

It is still another object of the invention to provide a tool storage arrangement for use with automatic tool changers for machine tools which includes a main tool storage magazine having tool sockets which are sized to receive tools having a predetermined shank size or configuration and an auxiliary tool storage magazine having a shank of said predetermined size or configuration to permit storage of the auxiliary tool storage magazine in the main tool storage magazine; and, in which the auxiliary tool storage magazine has sockets which are sized to receive tools with shanks having a size or configuration which is different than said predetermined size or configuration.

it is still a further object of the invention to provide an improved method for storing and transferring tools of different shank size for use with a machine tool.

In achievement of these objectives, there is provided in accordance with the invention, a combined tool storage and tool change arrangement for use with a machine tool of the type which includes a power driven rotatable spindle having a socket which receives a tool shank of a predetermined size, said tool storage arrangement comprising a main tool storage magazine for receiving and storing a plurality of tool members each having a shank of said predetermined size, said main tool storage magazine comprising a plurality of tool receiving sockets sized to respectively receive a tool having a shank of said predetermined size, means for moving said main tool storage magazine whereby to present a predetermined tool receiving socket to a first tool transfer point, an auxiliary tool storage magazine for receiving and storing a plurality of tools, said auxiliary tool storage magazine having a shank of said predetermined size whereby said auxiliary tool storage magazine may be stored in a socket of said main tool storage magazine, first tool transfer means for transferring said auxiliary tool storage magazine from said main tool storage magazine to a tool transfer station intermediate said main tool storage magazine and said spindle, means for indexing said auxiliary tool storage magazine at said tool transfer station whereby to present a predetermined tool carried by said auxiliary tool storage magazine to a second tool transfer point at said tool transfer station, and second tool transfer means for transferring said predetermined tool from said auxiliary tool storage magazine to said spindle. The auxiliary tool storage magazine is provided with sockets for receiving tools stored thereon, and the sockets are sized to receive tools having shanks of a size which is different than said predetermined size. The spindle is provided with an adapter to receive a tool having the shank of different size. The adapter itself has a shank of said predetermined size, whereby the adapter may be stored in the main tool storage magazine, and whereby the adapter may be received by the socket of the machine tool spindle.

Further objects and advantages of the invention will become apparent in connection with the accompanying drawings.

DESCRIPTION OF THE DRAWINGS

FIG. 3A is a view in vertical section of one of the tool receiving sockets carried by the endless chains 98 of main tool storage magazine 90;

FIG. 5 is a view taken in section along the line 5—5 of FIG. 4;

FIG. 6 is a fragmentary longitudinal sectional view taken along line 6—6 of FIG. 5;

FIG. 7 is a view taken in section along line 7—7 of FIG. 5;

FIG. 8 is a view in section along line 8—8 of FIG. 5;

FIG. 9 is a front elevational view of the tool change arm assembly of FIG. 4.

FIG. 10 is a rear elevational view of the upright which supports the tool change arm assembly of FIG. 4;

FIG. 11 is a side elevational view of the upright which supports the tool change arm assembly of FIG. 4;

FIG. 12A is an enlarged view in vertical section of the tilt unit shown in FIG. 12;

FIG. 14 is a top plan view of the tilt device of FIGS. 12 and 13, partially broken away, showing the operating mechanism for indexing the rotatable small tool carrier or auxiliary tool storage magazine which is positioned on the tilt device during Mode II operation (as defined in the specification);

FIG. 17 is a fragmentary plan view, partially broken away, of the tool change housing adjacent the spindle of the machining center;

FIG. 18 is a view taken along line 18—18 of FIG. 17;

DESCRIPTION OF THE PREFERRED EMBODIMENTS

Figure 1:
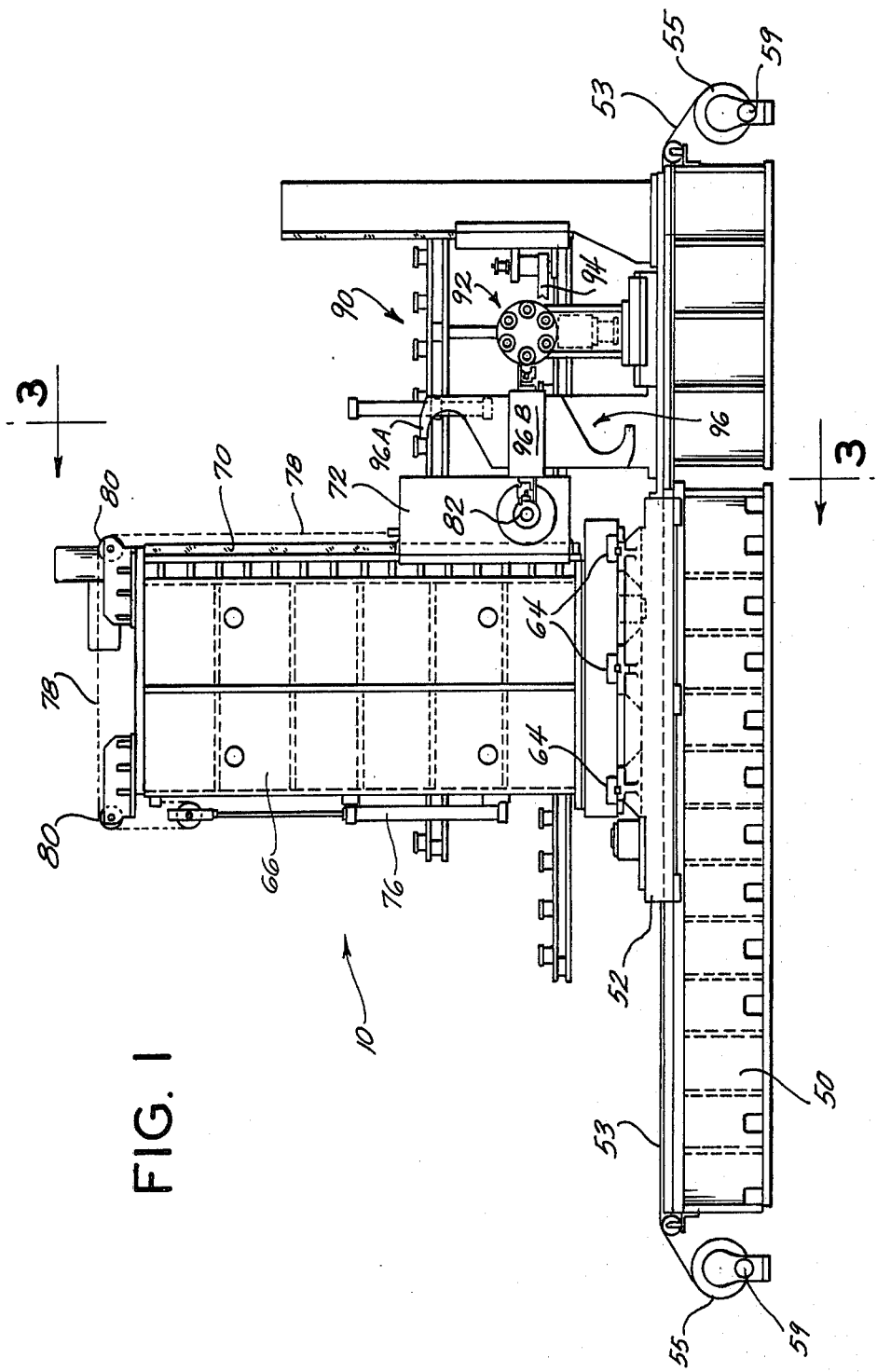
FIG. 1 is a front elevation view of a horizontal machining center which utilizes an automatic tool changer and tool storage arrangement in accordance with the present invention.
Figure 2:
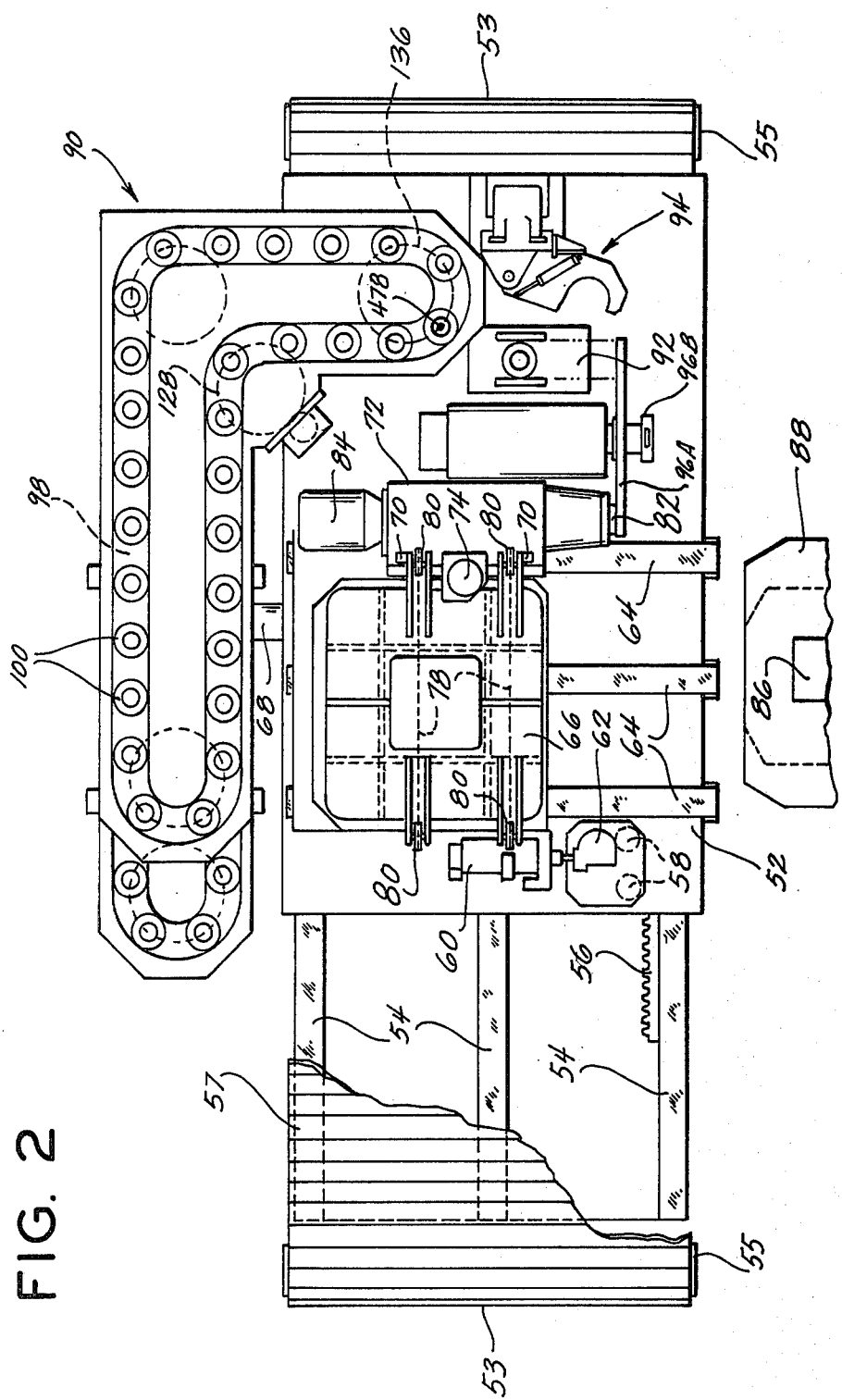
FIG. 2 is a top plan view of the machining center of FIG. 1.

Referring now to the drawings, and more particularly to FIGS. 1 and 2, which show the general arrangement of the of the apparatus, there is shown in the front elevational view of FIG. 1 and in the plan view of FIG. 2 a horizontal machining center, generally indicated at 10, which is equipped with the automatic tool changer and tool storage arrangement of the present invention. The machining center includes a bed 50 upon which a saddle 52 is slidably mounted on X-axis ways 54 (FIG. 2). Saddle 52 is driven along ways 54 by a rack and pinion drive which consists of a rack 56 (FIG. 2) on bed 50 and two pinions 58 on saddle 52 which are driven by a servo motor 60 through a conventional speed reduction gear box 62. Motor 60 is selectively energized by a conventional numerically controlled X-axis servo system (not shown) to move saddle 52 to any desired position along the X-axis.

A pair of flexible metallic cover sheets 53 are coupled between opposite side edges of saddle 52 and a corresponding pair of storage rollers 55 which are mounted on opposite ends of bed 50. Cover sheets 53 are both made of relatively narrow interlocked metal slats 57 (FIG. 2) and easily roll up on their respective rollers 55. Both rollers 55 are torsion biased away from saddle 52 by motors 59 (FIG. 1) and maintain a tension in cover sheets 53 at all times so that each cover sheet 53 will roll up automatically when saddle 52 moves toward it, while the opposing cover sheet 53 will be drawn off its roller 55 against the force of the corresponding motor 59. Cover sheets 53 protect the portions of X-axis ways 54 that are not covered by saddle 52.

A set of Z-axis ways 64, lying in a horizontal plane, are formed on top of saddle 52 perpendicular to X-axis ways 54. An upright 66 is slidably mounted on Z-axis ways 64 and is driven therealong by a conventional ballscrew drive (not shown) which is powered by a servo motor 68 (FIG. 2). Motor 68 is selectively energized by a conventional numerically controlled Z-axis servo system (not shown) to move upright 66 to any desired position along the Z-axis.

A set of vertical Y-axis ways 70 are formed on upright 66 perpendicular to both X-axis ways 54 and Z-axis ways 64. A spindlehead 72 is slidably mounted on Y-axis ways 70 and is driven therealong by a conventional ballscrew drive (not shown) which is powered by a servo motor 74 (FIG. 2). Motor 74 is selectively energized by a conventional numerically controlled Y-axis servo system (not shown) to move spindlehead 72 to any desired vertical position along the Y-axis.

A hydraulically actuated counterweight system is coupled to spindlehead 72 to take the weight of spindlehead 72 off the ballscrew drive therefor. The counterweight system includes two hydraulic piston and cylinder mechanisms 76 (FIG. 1), two cables 78 which are coupled between the respective hydraulic and piston cylinder mechanisms 76 and spindlehead 72, and pulleys 80 which guide cables 78. Hydraulic piston and cylinder mechanisms 76 apply a tension to cables 78 which is approximately equal and opposite to the weight of spindlehead 72 to take the weight of spindlehead 72 off the ballscrew drive.

The general arrangement thus far described under "DESCRIPTION OF THE PREFERRED EMBODIMENT" is substantially the same as shown and described in the aforementioned U.S. Patent Application Ser. No. 954,438, filed Oct. 25, 1978.

A spindle 82 is rotatably mounted in spindlehead 72 and, as will be explained in more detail later, is sized to receive a "large" tool having a shank of a particular predetermined configuration, size, or diameter (hereinafter referred to in the specification and claims as a "said predetermined size"), such as, for example, a four inch diameter shank. The words "large tool" as used in the specification and claims are intended to include any one of the following:

(1) A single tool having a shank of said predetermined size.

(2) A multiple spindle toolhead having a shank of said predetermined size, said toolhead carrying a plurality of tools which are being driven simultaneously by gearing carried by the multiple spindle toolhead, as shown, for example by FIG. 33 of the aforementioned U.S. Patent Application Ser. No. 954,438, filed Oct. 25, 1978.

(3) An adapter device in accordance with the invention, having a built-in tool retention mechanism for holding a tool having a different shank size than said predetermined shank size. For example, the tool supported by the adapter device may be a #50 taper shank tool. The adapter device itself has a shank of said predetermined size and is mounted on and rotatable with the spindle.

(4) An indexable carrier or auxiliary tool storage magazine for supporting a plurality (such as six) of tools. The indexable carrier has a shank of said predetermined size, whereby the carrier may be stored in a socket of the main tool storage magazine. The tools supported by a particular indexable rotary carrier have a shank size different than said predetermined size and may be, for example, #50 taper shank tools. In this case, the tool handling operations are performed in accordance with Mode II operation to be described.

It should be noted that main tool storage magazine 90 stores all of the "large" tools just described and that tool receiving sockets 100 of main tool storage magazine 90 are sized to receive the shanks of any of the "large" tools as hereinbefore defined, and also that the socket of the 90° tilt device, and also the socket of the machine tool spindle is sized to receive the shank of any of the "large" tools, except the indexable carrier 400 which has the proper size shank for spindle 82 but is never transferred to the spindle.

It should also be noted that in either the case of "large" tools or "small" tools, as set forth in the specification and claims, the term "tool" is intended, where applicable, to include the tool element which operates on the workpiece, and also the tool shank which is received in a socket of the main tool storage magazine, of the tilt device, or of the spindle (all in the case of the "large" tools), or in one of the sockets of the auxiliary magazine (in the case of the "small" tools), or in the socket of the adapter (also in the case of the "small" tools). All of the tools, whether "large" or "small" include a grooved flange which is adapted to be gripped by the appropriate tool change arm assembly.

Spindle 82 is driven in its rotary motion by a spindle motor 84 (FIG. 2) through a set of conventional speed change gears (not shown) to rotate spindle 82 at a desired speed in the desired direction to machine a workpiece 86 (FIG. 2) on a conventional worktable 88 positioned in front of bed 50. The details of worktable 88 are omitted since they are not relevant to the automatic tool changer of the present invention.

The automatic tool change of the invention includes:

(A) A double-deck main tool storage magazine 90 which is adapted to store a plurality of any of the "large" tools previously defined, each of the stored "tools" having a shank of said predetermined size or diameter, such as a four inch diameter cylindrical shank.

Main tool storage magazine 90 includes tool receiving sockets 100 which are sized to receive the shanks of any of the "large" tools as hereinbefore defined. Since one of the "tools" adapted to be received in the sockets 100 of the main tool storage magazine 90 is the indexable carrier or auxiliary tool storage magazine 400 which supports a plurality of the "small" tools 600 (such as #50 taper shank tools), it therefore follows that main tool storage magazine 90 also serves to store the "small" tools as well as the "large" tools since each indexable carrier or auxiliary tool storage magazine 400 when stored in main tool magazine 90 is provided with an assortment of "small" tools, different auxiliary tool storage magazines 400 carrying different assortments of "small" tools.

(B) A tilt unit, generally indicated at 92, which is adapted to receive any of the foregoing defined "large" tools which have a shank of said predetermined size or diameter. The tilt unit 92 is pivotally mounted to tilt from a vertical position, in which the tilt unit receives the tool from the main tool storage magazine 90, to a horizontal position parallel to the axis of spindle 82, in which it is in a proper plane to transfer the tool to spindle 82. Tilt unit 92 is also adapted to tilt from a horizontal position back to a vertical position. The tilt unit is adapted to receive the indexable carrier or auxiliary tool storage magazine 400. Indexable carrier 400 has a shank of said predetermined size or diameter which is received in a socket forming part of the tilt unit. A drive means is provided for rotatably indexing the socket of the tilt unit and the indexable carrier mounted in the socket, whereby to present a predetermined one of the tools on the indexable carrier to a pick-up station or tool transfer point for transfer to the spindle of the machine tool.

(C) A first tool change arm assembly 94, which is adapted to transfer any of the foregoing defined "tools" designated at (1), (2), (3) and (4), namely, the single tool, the multiple spindle toolhead, the adapter device, and the indexable small tool carrier or auxiliary tool storage magazine, all of which have a shank of said predetermined diameter, between main tool storage magazine 90 and the tilt unit 92.

(D) A second tool change arm assembly, generally indicated at 96 and comprising a pair of independently operated tool change arm assemblies 96A and 96B. Tool change arm assembly 96A is adapted to transfer any one of the "tools" designated at (1), (2) and (3) hereinbefore, namely, the single tool, the multiple spindle toolhead, or the adapter device, all of which have a shank of said predetermined diameter, from tilt unit 92 to spindle 82. Tool change assembly 96B is adapted to interchange the smaller diameter tools, such as the #50 tapered shank tools, between the indexable carrier or auxiliary tool storage magazine 400 and adapter device 500 mounted in spindle 82.

Main tool storage magazine 90 is a double-deck structure which supports two endless chains 98 (FIG. 2) of tool sockets 100. As best seen in FIG. 3A, each tool socket 100 of the endless chains 98 has a hollow cylindrical body 102 which has a central bore 104 which is of a size to receive a "large" tool of any of the types previously defined having a shank of said predetermined diameter, such as, for example, a four inch diameter straight shank.

Figure 3:
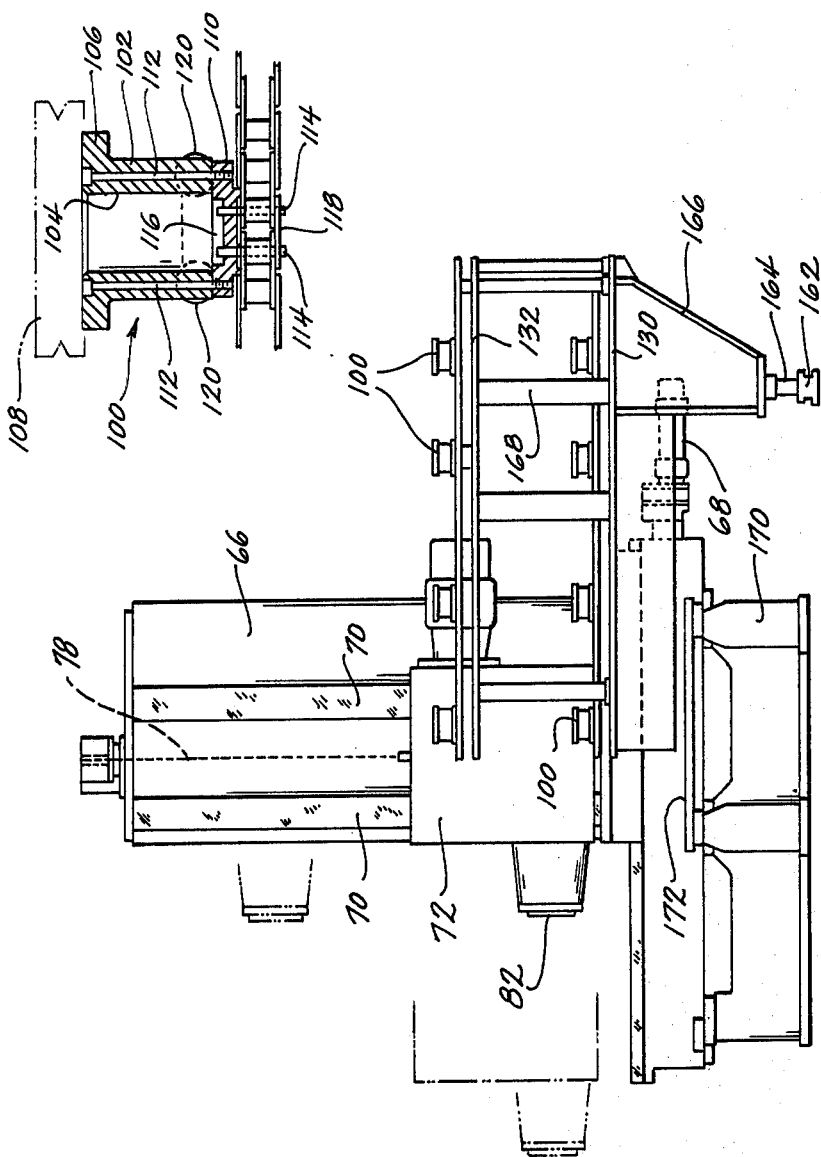
FIG. 3 is a view taken substantially along line 3—3 of FIG. 2.

A flange 106 is formed on the top of body 102 of each tool socket 100 for supporting the flange 108 on any of the large tools whose cylindrical shank (such as a four inch diameter straight shank) is received in bore 104 of tool socket 100. As seen in FIGS. 2 and 3, each of the endless chains 98 is guided and driven around a corresponding L-shaped path by means of conventional sprockets including a drive sprocket 128 (FIGS. 2 and 3) which is driven by a servo motor through a pinion gear engaging drive sprocket 128. Idler sprocket 136 (FIGS. 2 and 3) carries a plurality of angularly spaced stop lugs which are spaced apart from each other circumferentially by an angle corresponding to the spacing of tool sockets 100. Suitable proximity switches are positioned in the path of the stop lugs carried by the idler sprocket 136 and produce an output signal whenever one of the lugs carried by the sprocket passes over it whereby to count the tool sockets passing the proximity switch, and thus whereby to determine when a predetermined desired tool socket is in position to transfer or receive a tool received in the tool socket.

When the desired tool socket 100 is in the predetermined required position to transfer or receive a tool, the drive motor for the tool supporting endless chain is deenergized and suitable means, which forms no part of the present invention, is provided to insure that the desired tool socket 100 is properly located and oriented at tool transfer point 478 to transfer or receive a tool or other device supported in the tool socket.

FIG. 3 shows the supporting structure for tool storage magazine 90. The rear portion of tool storage magazine 90 at the right side of FIG. 3, is rollably supported on a stationary rail 162 by rollers 164 which are journaled to a base 166. Base 166 is attached to the lower plate 130 of the lower deck of tool storage magazine 90. A group of spaced posts 168 extend between lower plate 130 of the lower deck and the lower plate 132 of the upper deck of the tool storage magazine 90. The front portion of tool storage magazine 90 is slidably supported on bases 170 which extend from the adjacent portion of the X-axis bed 50 (FIG. 1). A base plate 172 is attached to the adjacent end of saddle 52 and slides over bases 170. The front portion of tool magazine 90 is supported by base plate 172 and thus moves with saddle 52 over the X-axis bed 50 and bases 170. Base plate 172 also supports tool change arms 94, 96A and 96B, and tilt unit 92 (see FIG. 2). Upright 66, tool storage magazine 90, tool change arm assemblies 94, 96A and 96B, and tilt unit 92 all move as a unit with saddle 52.

Referring to FIG. 2, a first tool change arm assembly generally indicated at 94 transfers "large" tools (such as the four inch diameter cylindrical shank tools) as previously defined, from main tool storage magazine 90 to tilt unit 92. Tilt unit 92 is in the position shown in FIG. 16 of the drawings, with piston and cylinder mechanism 390 in extended position, when tilt unit 92 receives a tool from first tool change arm assembly 94.

Figure 4:
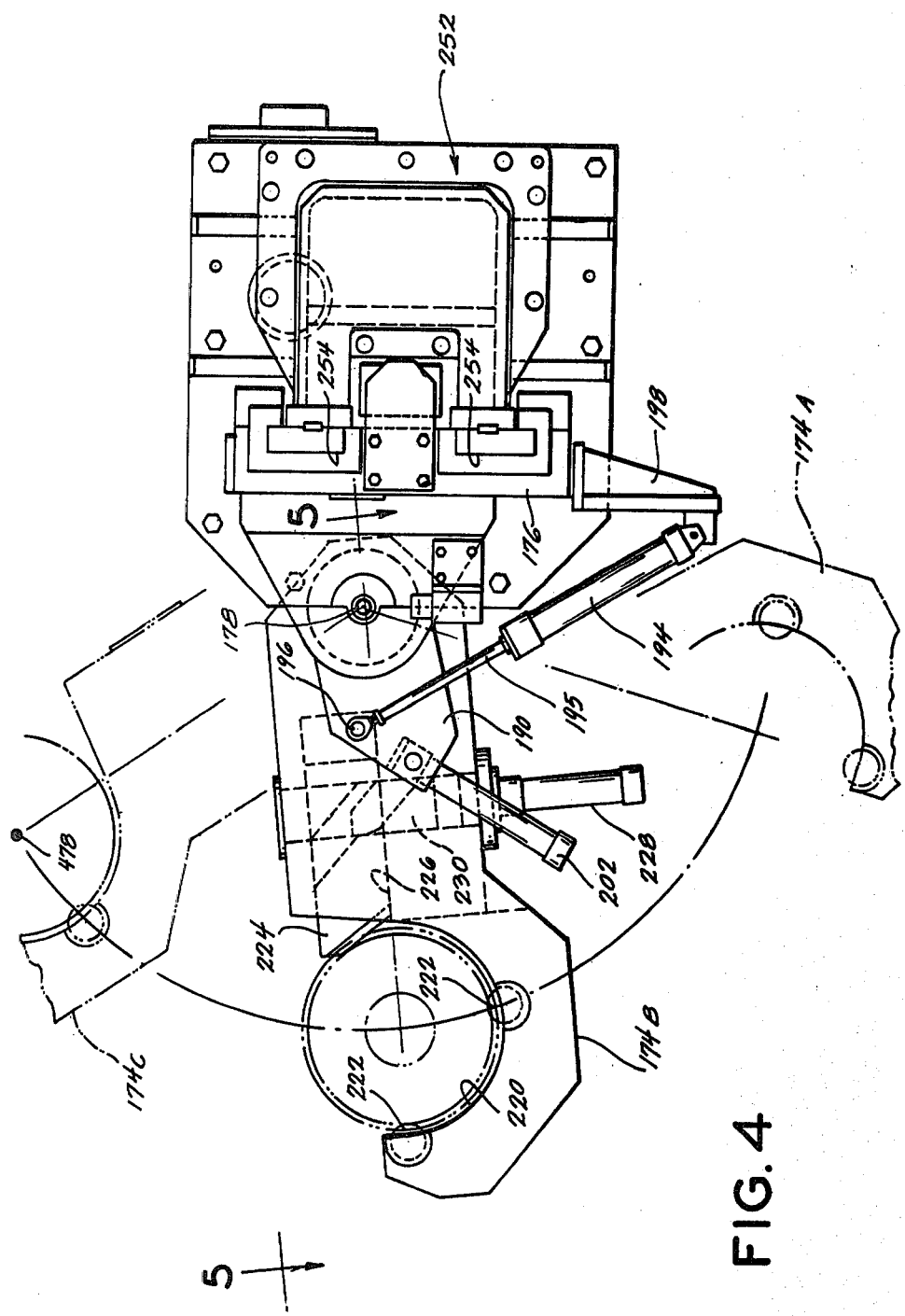
FIG. 4 is a plan view of the tool change arm assembly which transfers tools (as defined in the specification) from the main tool storage magazine to the tilt unit and vice versa.

Referring to FIGS. 4 and 5, first tool change arm assembly 94 comprises a tool gripper arm 174 which is rotatably mounted on a base 176 for rotation about a vertical axis 178 (FIG. 5). Tool gripper arm 174 is rotatable from a forward position, indicated in FIG. 4 by broken outline 174A, to a central position indicated in FIG. 4 by the solid outline 174B, to a rear position indicated in FIG. 4 by broken outline 174C. In the rear position, tool gripper arm 174 picks up a tool from tool storage magazine 90. In the central position, the tool is placed in tilt unit 92. In the forward position, tool gripper arm 174 is clear of tilt unit 92 so that the latter can tilt forward. On the return portion of the cycle, tool gripper arm 174 picks up a tool from tilt unit 92 in the central position and transfers it to tool storage magazine 90 in the rear position.

Tool gripper arm 174 is rigidly attached to a vertical shaft 184 (FIG. 5) which is rotatably attached to brackets 186 on base 176 by bearings 188. A horizontal bracket 190 is rotatably attached to shaft 184 by bearings 192 and is moved by a hydraulic piston and cylinder mechanism 194 (FIG. 4) which, in its retracted position, moves arm 174 to its forward position, and which in its extended position, moves arm 174 from its forward position to its central position. The piston rod 195 of hydraulic piston and cylinder mechanism 194 is connected to bracket 190 by a pivotal connector 196. The other end of hydraulic piston and cylinder mechanism 194 is pivotally connected to a bracket 198 on base 176.

A bracket 200 (FIG. 5) is attached to a projection 201 of bracket 190 by machine screws 203. Bracket 200 provides a pivotal mounting for another hydraulic piston and cylinder mechanism 202 which is pivotally coupled between brackets 190 and 200 by trunnions 204 (FIG. 9). The piston rod 206 (FIG. 9) of hydraulic piston and cylinder mechanism 202 is pivotally coupled to a bracket 208 (FIG. 5) on tool gripper arm 174 by a pivotal connector 210. Hydraulic piston and cylinder mechanism 202, when extended, moves arm 174 from its central position 174B (FIG. 4) to its rear position, indicated by broken outline 174C in FIG. 4. When hydraulic piston and cylinder mechanism 202 is retracted, it moves arm 174 from its rear position 174C to its central position, indicated by the solid line position 174B in FIG. 4. A pair of cam actuated limit switches 212 and 214 (FIGS. 5 and 9) indicate when arm 174 is in the forward, central or rear position. Limit switch 212 is actuated by cam 216 and limit switch 214 is actuated by cam 218. Both cams 216 and 218 are mounted on a shaft 219 which is attached to shaft 184.

A semicircular gripper cavity 220 (FIG. 4) is formed in the end of arm 174. A pair of rollers 222 and a movable jaw member 224 are movably mounted in arm 174 and are positioned around gripper cavity 220 in position to grip the grooved flange provided on each of the tools to securely hold the tool in arm 174 for transfer. Movable jaw member 224 is slidable in slot 226 in arm 174 between an extended position shown in FIG. 4 and a retracted position (not shown) in which jaw member 224 is completely withdrawn into slot 226. Jaw member 224 is moved back and fourth between its extended and retracted positions by a hydraulic piston and cylinder mechanism 228 which moves a slide 230 in a slot 231 (FIG. 6) crossways of jaw member 224. Slide 230 has a raised cam portion 232 (FIG. 6) which extends at a 45° angle α to the edge of slide 230 and slidably engages a cam slot 234 in jaw 224. Cam slot 234 extends at the same angle α of 45° to the edge of jaw member 224 and interacts with the raised cam portion 232 of slide 230 to move jaw member 224 between its extended and retracted position.

When hydraulic piston and cylinder mechanism 228 is extended, jaw member 224 is retracted and when hydraulic piston and cylinder mechanism 228 is retracted, as shown in FIG. 6, jaw member 224 is extended.

The tip 236 (FIG. 6) of cam portion 232 and the adjacent portion of slot 234 are angled at a small angle β to the edge of slide 230 to provide for a reduced rate of movement at the end of the retraction stroke of hydraulic piston and cylinder mechanism 228 to lock the tool in gripper jaw cavity 220. Movement of cam portion 232 along the edge 236 will continue until jaw member 224 exerts enough pressure on the tool therein to counteract the retraction force of hydraulic piston and cylinder mechanism 228.

Referring to FIGS. 5, 7 and 8, the bottom of slot 226 in tool gripper arm 174 is closed by a cover plate 238 which is attached to gripper arm 174 by machine screws 240. The end of slot 231 is closed by a cover plate 242 (FIG. 7) which is attached to gripper arm 174 by machine screws 244. A limit switch 246 (FIGS. 5 and 8) is mounted on the bottom of cover plate 238 by machine screws 248. A spring loaded plunger 250 (FIG. 8) bears against the bottom of gripper jaw 224 and actuates switch 246 when gripper jaw 224 is in its retracted position.

Tool gripper base 176 is slidably mounted for vertical movement on an upright 252 (FIGS. 4, 10 and 11). A set of vertical ways 254 (FIGS. 4, 9 and 11) are formed on upright 252 to guide the vertical movement of tool gripper base 176. Two vertical movements are required for base 176. The first is a short upward movement to lift a tool from the tool storage socket 100 with which tool gripper arm 174 is aligned, along with the complementary short downward movement to lower a tool into the tool storage socket 100. The second vertical movement is a longer upward movement to raise tool gripper arm 174 from the lower deck of tool storage magazine 90 to the upper deck thereof, along with the complementary downward movement to lower tool gripper arm 174 from the top deck to the lower deck.

These two movements are obtained by two hydraulic piston and cylinder mechanisms 256 and 258 (FIG. 10) which are connected together in tandem, the base of the longer cylinder 258 being connected to and supported by the end of the piston rod of the shorter piston and cylinder mechanism 256. The end of the piston rod 260 of the longer piston and cylinder mechanism 258 is attached to a bracket 262 on the top of tool gripper base 176 by a machine screw 264 (FIGS. 9 and 10). FIGS. 10 and 11 show the longer piston and cylinder mechanism 258 in its fully extended position and the shorter piston and cylinder mechanism 256 in its fully retracted position. This places tool gripper arm 174 in position to pick up a tool from the upper deck of tool storage magazine 90. After the tool has been gripped by gripper arm 174 it is lifted out of its socket 100 by extension of piston and cylinder mechanism 256. Then, after tool gripper arm 174 has been swung clear of tool storage magazine 90, both piston and cylinder mechanisms 256 and 258 are retracted to drop the tool into tilt unit 92.

With both piston and cylinder mechanisms 256 and 258 retracted, tool gripper arm 174 is vertically positioned to grip a tool in the lower deck of tool storage magazine 90. An extension of piston and cylinder mechanism 256 will then lift the gripped tool out of its socket 100. The tool gripper arm 174 is then swung over tilt unit 92 (see FIG. 2) and piston and cylinder mechanism 256 is retracted to drop the tool into tilt unit 92.

Four limit switches 266, 268, 270 and 272 (FIG. 11) are mounted on upright 252 and interact with the adjacent edge of tool gripper base 176 to indicate which of the four possible vertical positions that base 176 is in at any time.

Tool change arm assembly 94 and the associated structure just described in connection with FIGS. 4–11, inclusive, are substantially the same as disclosed in connection with FIGS. 10–17, inclusive, of the aforementioned U.S. patent application Ser. No. 954,438, filed Oct. 25, 1978.

Figure 12:
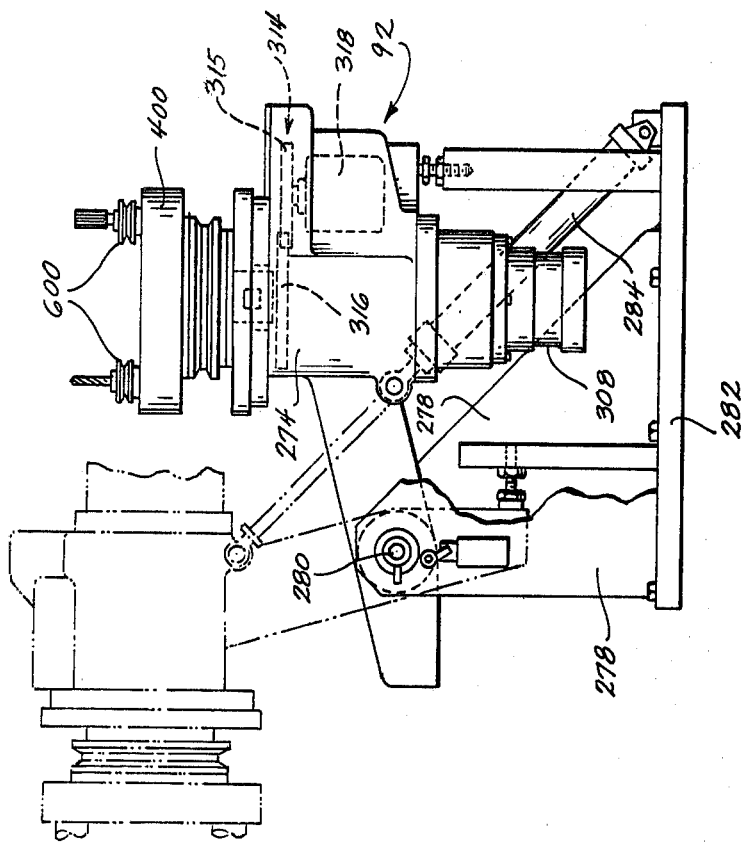
FIG. 12 is a view partially in vertical elevation and partially in vertical section of the 90° tilt device, with the tilt device being shown in phantom in its horizontal tilted position.
Figure 13:
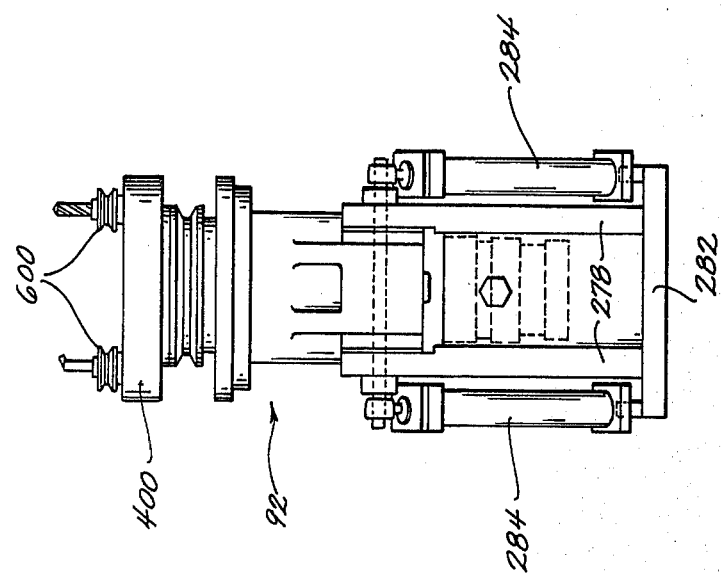
FIG. 13 is an end view of the tilt device of FIG. 12, with the tilt device being shown in its normally vertical position corresponding to the full line view of FIG. 12.

FIGS. 12, 13 and 14 show the details of the tilt unit 92 which is adapted to receive a "large" tool of any of the types previously defined from first tool change arm assembly 94. The shank of the tool being transferred, as stored in main tool storage magazine 90 and as received by first tool change arm assembly 94, is in a vertical position. After having received the transferred tool from tool change arm assembly 94, tilt device 92 tilts the tool through an angle of 90° whereby the shank of the tool is then in a common horizontal plane with rotatable spindle 82 of the machine tool.

Tilt unit 92 comprises a housing 274 having pivotally connected thereto an arm 276, which is pivotally attached to a pair of upstanding triangular sides 278 by trunnions 280. Triangular sides 278 are bolted to base plate 282.

Housing 274 can be pivotally moved from a vertical position, shown in solid lines in FIG. 12, to a horizontal position, shown in broken lines in FIG. 12, by extension and retraction of two hydraulic piston and cylinder mechanisms 284, which are pivotally connected at one end to base plate 282 and are pivotally connected at the other end to housing 274. Within housing 274 there is positioned a cup-like socket generally indicated at socket 290. Within the hollow interior of socket 290, there is positioned a collet clamp 292 of generally hollow cylindrical shape. Rigidly secured to or integral with clamp 292 is a base portion 294, which is fixed to or otherwise secured to a shaft 296. Shaft 296 passes downwardly through a passage 299 in base portion 302 of socket 290, shaft 296 passing below base portion 302, with shaft 296 being provided at the lower portion thereof with a shoulder 304 upon which are seated a plurality of Belleville springs 306 which urge shaft 296 in a downward direction whereby to move collet clamp 292 to clamped position. A short hydraulic piston and cylinder mechanism 308 is mounted at the lower end of housing 274 and includes a piston rod 310 which underlies but is not positively connected to the lower end of shaft 296 carried by collet clamp 292. When hydraulic piston and cylinder mechanism 308 is actuated to move piston rod 310 to an extended position, piston rod 310 bears against the lower end of shaft 296 of the collet mechanism and moves collet clamp 292 to unclamped position against the force of Belleville springs 306. Collet clamp 292 serves to clamp the cylindrical shank of any "large" tool which may be received by socket 290.

In the view shown in FIG. 12, shank 402 of indexable carrier or auxiliary tool storage magazine 400 is shown mounted in socket 290 of tilt device 92. Carrier 400 is provided with a plurality of angularly spaced sockets for receiving a plurality, such as six, of the individual small tools each generally indicated at 600 which are adapted to be transferred by tool change arm assembly 96B to the adapter 500 on spindle 82. Adapter 500 is provided with a built-in small tool retention mechanism as will be explained in more detail hereinafter. However, socket 290 of tilt device 92 can also receive the shank of any of the other "large" tools as hereinbefore defined, including (1) the shank of a single tool, such as, for example, a tool of the type illustrated in FIG. 39 of the aforementioned U.S. patent application Ser. No. 954,438 filed Oct. 25, 1978; (2) the shank of a multiple spindle toolhead such as that shown by FIG. 33 of the aforementioned U.S. patent application Ser. No. 954,438; or (3) the shank of adapter 500 (FIG. 22) for retaining a single "small" tool 600 in spindle 82.

A flange member 312 of tilt device 92 is secured to the upper end of cylindrical socket member 290 and the driven member 316 of a Geneva drive mechanism generally indicated at 314 is secured to or is an integral part of flange 312. The under surface of flange 312 rests on the upper end of outer casing or housing 274 of tilt device 92. Drive member 315 of the Geneva drive mechanism is in driving relation with the Geneva driven member 316. Geneva drive member 315 is rotatably driven by a single revolution motor 318. Motor 318 may be operated by any suitable power means and may be electrically or hydraulically operated for example.

Geneva mechanisms are well-known per se. As best seen in FIG. 14, drive member 315 of the Geneva mechanism is provided with a pin member 320 which engages angularly spaced slots 332 in the outer periphery of the Geneva driven member 316, whereby one rotation of drive member 315 indexes driven member 316 and hence indexable carrier or auxiliary tool storage magazine 400 by one angular step. Therefore it can be seen that if the indexable carrier or auxiliary tool storage magazine 400 has six angularly spaced "small" tools supported thereby, and if the Geneva driven member 316 is provided with a corresponding number of slots engaged by pin 320 of Geneva drive member 315, that each rotation of Geneva drive member 315 will cause auxiliary tool storage magazine 400 to index through one angular step whereby to permit indexing a predetermined desired small rotary tool 600 into proper position for transfer to adapter 500 of tool spindle 82.

During the "Mode I" operation of the tool changing operation, as will be explained hereinafter, when rotary carrier 400 is not mounted on tilt unit 92, the Geneva mechanism 314 is not in use and motor 318 is deenergized.

In Mode I operation, Geneva drive member 315 is stopped in a "park" position in which edge 315A of Geneva drive member 315 abuts against edge 316A of Geneva driven member 316 to thereby stabilize the rotatable socket member 290 to which Geneva driven member 316 is secured, and to prevent rotation or other movement of socket member 290 during Mode I operation.

As best seen in FIGS. 1, 2, 15, 16, 17, 18 and 21, two tool change arm assemblies, respectively generally indicated at 96A and 96B, are provided to effectuate the interchange of tools between 90° tilt device 92 and machine tool spindle 82. Tool change arm assembly 96A serves the function of transferring large shank diameter tools between tilt device 92 and spindle 82. Tool transfer arm assembly 96B is used only in Mode II operation and serves the function of transferring small shank diameter tools, such as the #50 taper shank tools, between indexable carrier or auxiliary tool storage magazine 400 mounted in tilt device 92 and adapter 500 carried by spindle 82 for receiving and holding small diameter tools.

Figure 21:
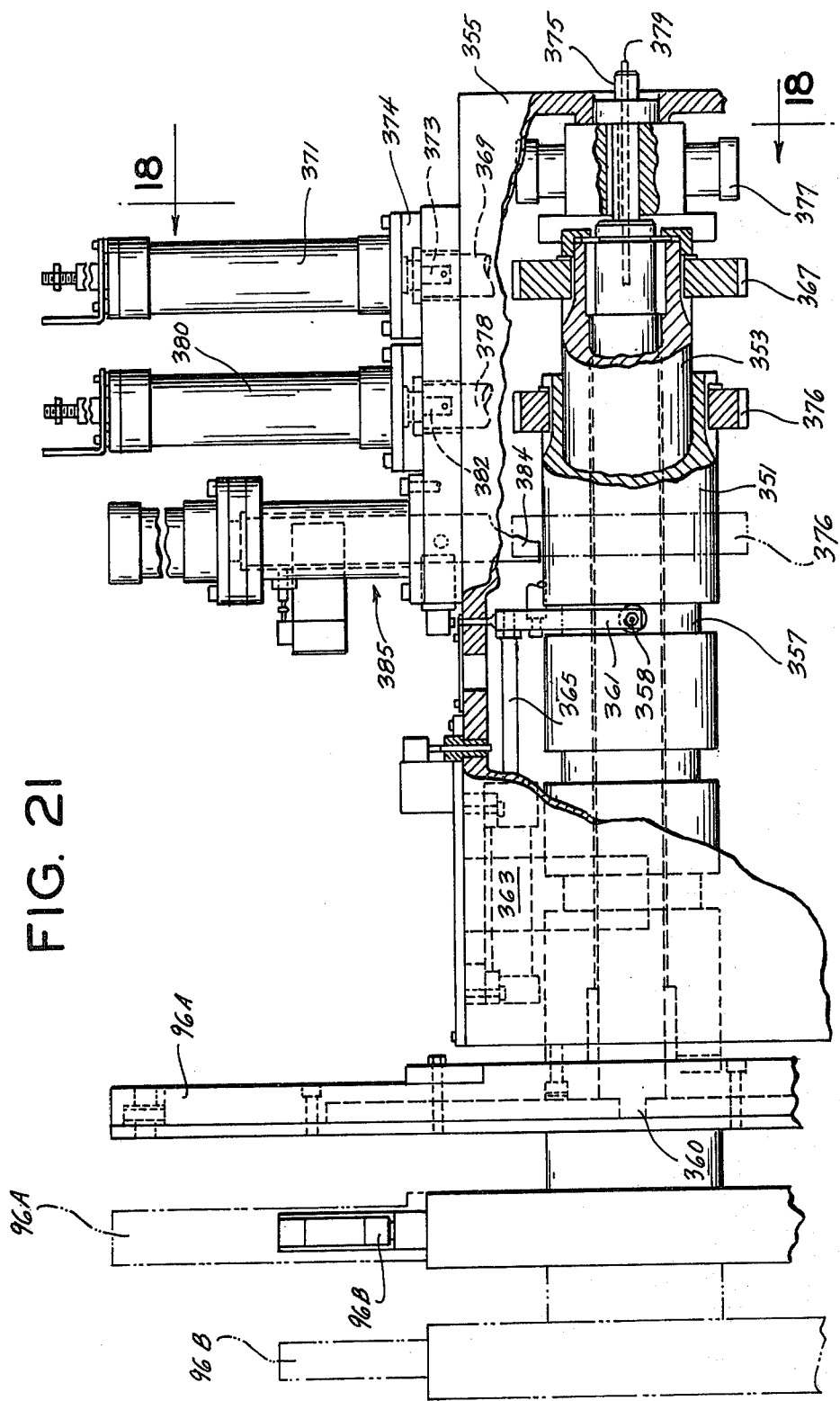
FIG. 21 is a fragmentary plan view, partially cut away, of the two selectively operable tool change assemblies which transfer tools (as defined in the specification) between the tilt unit and the spindle of the machining center.

As best seen in FIGS. 17, 18 and 21, tool transfer arm assemblies 96A and 96B are respectively mounted on and fixed to coaxial shafts 351 and 353, whereby any axial or rotary movement of the respective shaft on which it is mounted causes a corresponding movement of the respective tool transfer arm assembly 96A or 96B. Shaft 351 is the outer shaft and is positioned coaxially about inner shaft 353. Outer shaft 351 and inner shaft 353 are capable of rotating independently of each other.

The two coaxial shafts 351 and 353 are rotatably mounted in an upright 355 by conventional means (not shown) and both shafts are slidable axially together along their common longitudinal axis to move both tool transfer arm assemblies 96A and 96B between a rear position shown in solid line in FIG. 21 and a forward position shown in broken lines in FIG. 21, or vice versa. The two tool transfer arm assemblies 96A and 96B, as best seen in FIG. 21, are axially displaced from each other a short distance along their common longitudinal axis.

Outer shaft 351 is circumferentially slotted at 357 to receive a pair of rollers 358 (FIG. 21) which are mounted on a yoke 361. Yoke 361 is moved axially back and forth (right and left in FIG. 21) by a hydraulic piston and cylinder mechanism 363 whose piston rod 365 is rigidly attached to yoke 361. Any axial movement of yoke 361 causes a corresponding axial movement of both outer and inner shafts 351 and 353. In order to insure that both coaxial shafts 351 and 353 move together in an axial direction, the right-hand end of inner shaft 353 (relative to the view of FIG. 21) is provided with a circumferential groove therein which receives a snap ring 354 therein. Snap ring 354 projects beyond the outer periphery of inner shaft 353 and is received in a groove defined by a retainer 356 mounted at the contiguous outer end of outer shaft 351. This arrangement causes shafts 351 and 353 to move together axially but permits shafts 351 and 353 to rotate angularly independently of each other. When piston rod 365 is extended, it moves both tool transfer arm assemblies 96A and 96B to the rear position shown by solid lines in FIG. 21. When piston rod 365 is retracted, it moves both tool transfer assemblies 96A and 96B to the forward position shown by broken lines in FIG. 21.

A spur gear 367 (FIG. 21) is rigidly attached to inner shaft 353 contiguous the rear (right-hand in FIG. 21) end of inner shaft 353 and engages a rack 369 when coaxial shafts 351 and 353 are in their rear position. Rack 369 is moved linearly by a hydraulic piston and cylinder mechanism 371 whose piston rod 373 is attached to rack 369 and whose cylinder is attached to a bracket 374 on upright 355. The full stroke of rack 369 rotates inner shaft 353 through 90° to rotate tool transfer arm 96B from its vertical or "parked" position shown in FIG. 16 to its horizontal operative position shown in FIGS. 1 and 15. The vertical position of tool transfer arm assembly 96B is the stand-by position, and the horizontal position thereof is the tool pick-up or deposit position.

In a similar manner, a spur gear 376 is rigidly attached to outer shaft 351 and engages a rack 378 when shaft 351 is in its rear position shown in solid lines in FIG. 21. Rack 378 is moved linearly by a hydraulic piston and cylinder mechanism 380 whose piston rod 382 is attached to rack 378 and whose cylinder is attached to bracket 374 on upright 355. Piston and cylinder mechanism 380 and rack 378 are all so dimensioned that one-half of the full stroke of piston rod 382 causes a 90° movement of outer shaft 351 to thereby rotate tool change arm assembly 96A from its vertical position (shown in FIGS. 1 and 15) to its horizontal position shown in FIG. 16. The vertical position of tool change arm assembly 96A is the stand-by position and the horizontal position thereof is the tool pick-up or deposit position.

When outer shaft 351 and tool transfer arm assembly 96A are in their forward position, shown by broken lines in FIG. 21, gear 376 carried by outer shaft 351 is aligned with a second rack 384 (FIG. 21). The piston rod 386 of piston and cylinder mechanism 385 is attached to rack 384 and piston rod 386 and rack 384 are so dimensioned that the full stroke of piston rod 386 rotates outer shaft 351 and tool change arm assembly 96A through 180° to interchange the ends of tool change arm assembly 96A. This rotation through 180° only occurs when shaft 351 and tool change arm assembly 96A are in their forward position shown by broken lines in FIG. 21. In the axially forward position of shaft 351, the tools supported by tool change arm assembly 96A do not lie within a retaining socket, either in the spindle contiguous one end of tool change arm assembly 96A, or in the socket carried by tilt device 92 contiguous the opposite end of the tool change arm assembly 96A.

When inner shaft 353 and tool change or transfer arm assembly 96B are in their forward position, shown by broken lines in FIG. 21, gear 367 carried by inner shaft 353 moves into alignment with rack 378 of piston and cylinder mechanism 380. Movement of piston rod 382 to its full stroke rotates inner shaft 353 and tool change arm assembly 96B through 180° to interchange the ends thereof in the same manner as described hereinbefore in connection with tool change arm assembly 96A.

Tool change arm assembly 96A comprises a tool gripper arm 298 (FIGS. 19 and 20) which is similar to tool gripper arm 298 of the aforementioned U.S. patent application Ser. No. 954,438, filed Oct. 25, 1978, as shown in and described in connection with FIGS. 25 and 26 of that application. Tool gripper arm 298 has opposed tool gripper cavities 344 and 346 which contain rollers 348. Rollers 348 are dimensioned and positioned to fit in a standard grooved flange on any of the "large" tools as hereinbefore defined. A pair of rotary tool gripper jaws 350 and 352 are rotatably attached to arm 298 adjacent to gripper cavities 344 and 346. Tool gripper jaws 350 and 352 have gripping segments 354 and 356, respectively, which are shaped to enter the grooved flange on the "large" tool. Gripper jaws 350 and 352 are spring biased by torsion springs (not shown) to urge gripping segments 354 and 356 away from tool cavities 344 and 346, respectively. The movement of gripping segments 354 and 356 away from tool cavities 344 and 346 is limited by the abutment of the straight edges 370 and 372 of gripper jaws 350 and 352 with stop pins 362 and 364, respectively.

Figure 19:
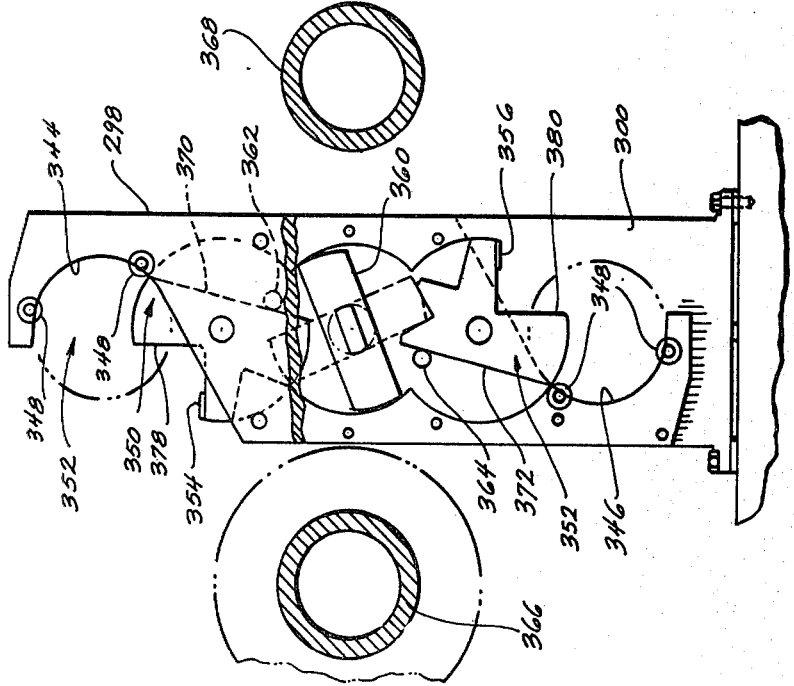
FIG. 19 is a front elevational view with the front cover cut away of the tool change assembly which is used to interchange large diameter tools between the tilt unit and the machine tool spindle, with the tool change assembly being shown in vertical position.

A cam 360 with an open position shown in solid lines in FIG. 19 and a locked position shown in broken lines in FIG. 19 is rotatably mounted between gripper jaws 350 and 352. In the locked position shown in FIG. 20, both gripper jaws 350 and 352 are rotated toward their respective tool cavities 344 and 346 to insert tool grip segments 354 and 356 into the grooved flange of tools 366 and 368, respectively. In the position shown in FIG. 20, both tool gripper jaws 350 and 352 are locked in the position shown by cam 360, which abuts against the straight edges 370 and 372 on jaws 350 and 352, respectively. This locks tools 366 and 368 in tool cavities 344 and 346, respectively. Cam 360 is mounted to be able to float laterally to equalize clamping pressure. To release tools 366 and 368, cam 360 must be rotated 90° counterclockwise from the position shown in FIG. 20 back to the position shown in solid lines in FIG. 19. This permits tool gripper jaws 350 and 352 to rotate counterclockwise in FIG. 20 away from tool cavities 344 and 346, respectively.

Figure 20:
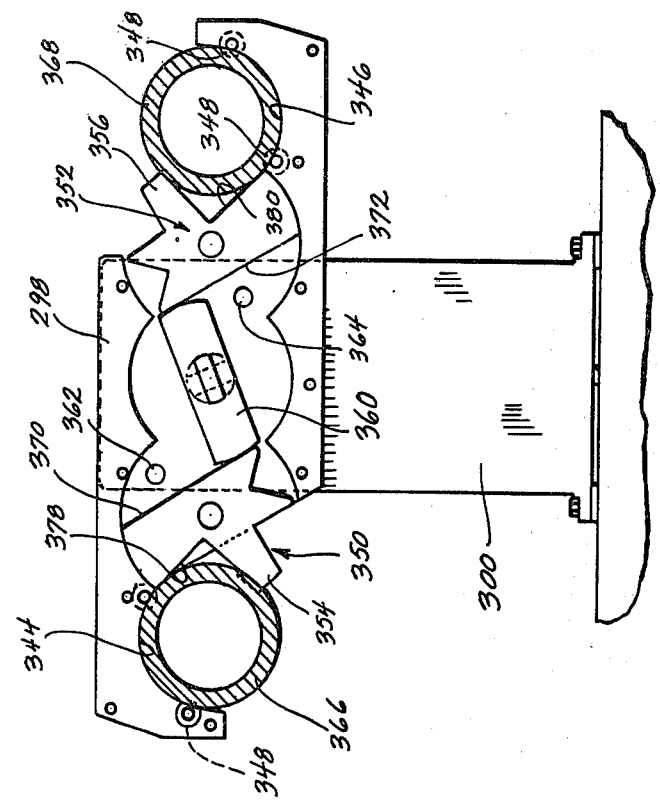
FIG. 20 is a front elevational view with the front cover cut away of the tool change assembly of FIG. 19 in its horizontal position.

Referring to FIGS. 20 and 21, cam 360 is attached to a shaft 375 (FIG. 21) which extends through the hollow interior of inner shaft 353. The rear end of shaft 375 (on the right side of FIG. 21) is connected to a hydraulic rotary actuator 377, such as manufactured by the Flo-Tork Company, Orrville, Ohio. Rotary actuator 377 acts to rotate shaft 375 by 90° clockwise or counterclockwise in response to electrical signals. The 90° rotation of shaft 375 rotates cam 360 between its open and locked position as described previously.

Tool 366 in FIG. 19 is in spindle 82 while tool 368 is in tilt unit 92. To exchange tools 366 and 368, upright 66, saddle 52, and spindlehead 72 are moved by the N.C. axis servo systems to the positions shown in FIGS. 1 and 2. Tool change arm 298 is then rotated 90° counterclockwise from the position shown in FIGS. 1 and 19 to the position shown in FIG. 20. As tool cavities 344 and 346 approach tools 366 and 368, the latter contact flat edges 378 and 380 of gripper jaws 350 and 352 and cause them to rotate to move gripper segments 354 and 356 into the grooved flanges of the respective tools 366 and 368. Gripper segments 354 and 356 are then locked in position by rotating cam 360 by 90° counterclockwise to the position shown in FIG. 20.

To unlock gripper jaws 350 and 352, cam 360 is rotated 90° clockwise in FIG. 20, which releases gripper jaws 350 and 352 to rotate away from tools 366 and 368 under the urging of their respective torsion springs (not shown).

Although the operation of tool change arm 298 has been described in connection with tools on both ends of the arm, it will work as well with a single tool at either end of the arm.

Figure 15:
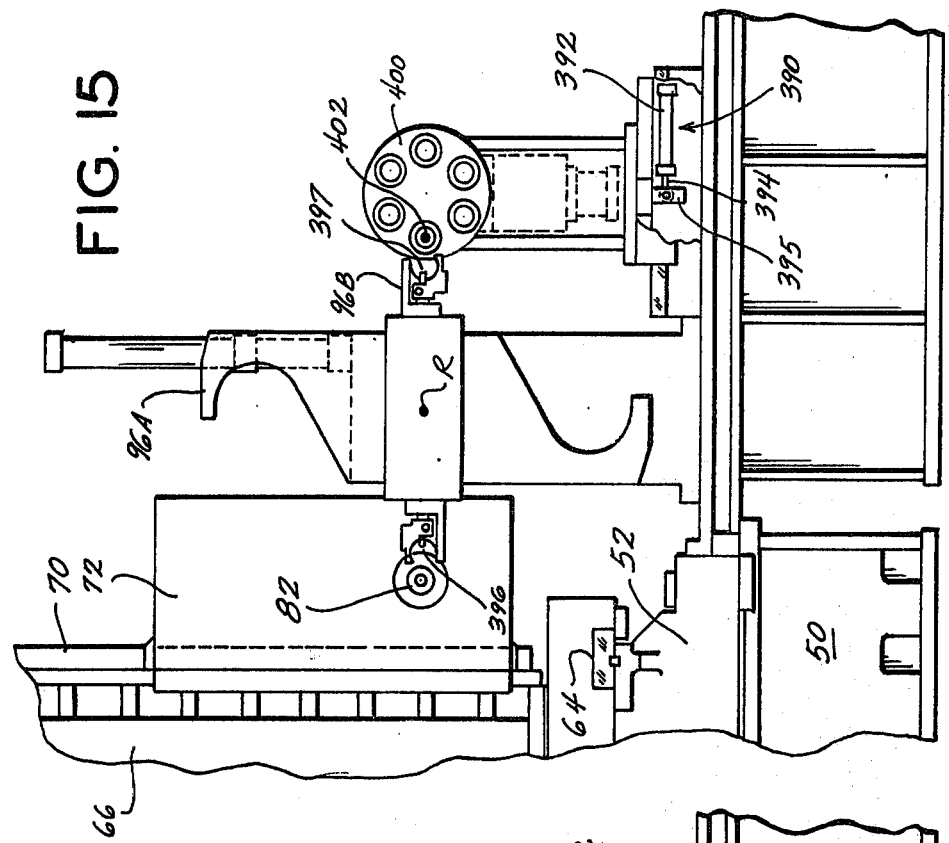
FIG. 15 is an enlarged fragmentary portion in elevation of the right-hand end of FIG. 1, showing the tool change arm assembly used for interchanging small tools between the indexable small tool carrier or auxiliary tool storage magazine and the machine tool spindle in operative position preparatory to interchanging small tools between the rotatable small tool carrier and the spindle of the machine tool.
Figure 16:
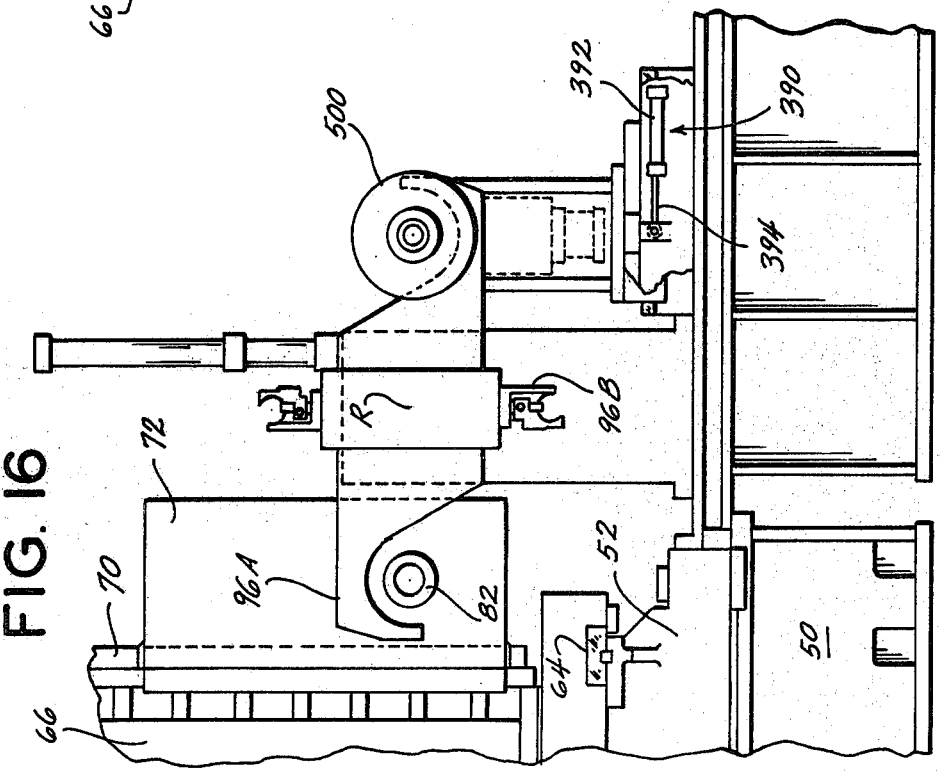
FIG. 16 is a view of the "other" or second tool change arm of the two selectively operable tool change arms, the second tool change arm being used for interchanging larger diameter tools between the tilt device and the spindle of the machine tool, the second of the tool change arms being shown in operative position in readiness to transfer to the machine tool spindle the adapter which receives the shanks of the small tools when the small tools are being rotatably driven by the machine tool spindle.

As best seen in FIGS. 15 and 16, the 90° tilt device 92 is mounted for axial sliding movement from right to left (or vice versa) with respect to the views shown in FIGS. 1, 2, 15 and 16. The motive power for the axial adjusting movement of tilt device 92 is provided by a piston and cylinder assembly, generally indicated at 390, including a hydraulic cylinder 392 which is suitably anchored at one of its ends to the stationary structure and a piston rod 394 which is pivotally connected to a member 395 which forms part of the tilt device structure. In the position shown in FIG. 15, piston rod 394 is retracted into cylinder 392, and the slidably mounted tilt device 92 is at the extreme right end of its possible path of movement of travel. The position of tilt device 92 shown in the view of FIG. 15 is the location of the tilt device when tool change arm assembly 96B which interchanges the "small" tools between auxiliary tool storage magazine 400 and spindle 82 is in use. When tool change arm assembly 96A which interchanges large size shank tools between tilt unit 92 and spindle 82 is in use, slidably movable tilt device 92 is in the position shown in FIG. 16. In moving from the FIG. 15 position to the FIG. 16 position, or vice versa, tilt unit 92 moves a distance equal to the radius of rotary carrier or auxiliary tool storage magazine 400. The reason for providing this capability for shifting the tilt device 92 from the position shown in FIG. 15 corresponding to the retracted position of piston rod 394, and the position shown in FIG. 16 corresponding to the extended position of the piston rod 394 is that the two selectively operable tool transfer arm assemblies 96A and 96B, which respectively interchange large diameter shank tools and small diameter shank tools, are mounted for pivotal movement about a common axis of rotation indicated at R in FIGS. 15 and 16, and in order that the two tool change arm assemblies 96A and 96B be in proper position to grip the grooved flanges of the "large" and "small" tools, respectively, it is necessary to move the 90° tilt device 92 in the manner just described.

The tool change assembly generally indicated at 96B, for interchanging small tools, such as the #50 taper shank tool, between spindle 82 and indexable carrier or auxiliary magazine 400 is similar to the tool change mechanism 172 shown in U.S. Pat. No. 3,704,510 issued to Robert K. Sedgwick et al on Dec. 5, 1972. In view of the fact that the tool change mechanism 96B is shown in a prior issued patent, it is not believed necessary to show or describe the tool change mechanism 96B in detail in the present application. However, it will be noted, as seen in FIG. 21, that shaft 375 has a hollow axial passage therethrough for the entire length of shaft 375, and a shaft 379 extends through the hollow passage of shaft 375 and has a pinion (not shown) mounted at the left-hand end thereof (relative to FIG. 21) to actuate a rack which forms part of tool change assembly 96B, whereby to actuate tool grips 396 and 397 (FIG. 15).

Figure 22:
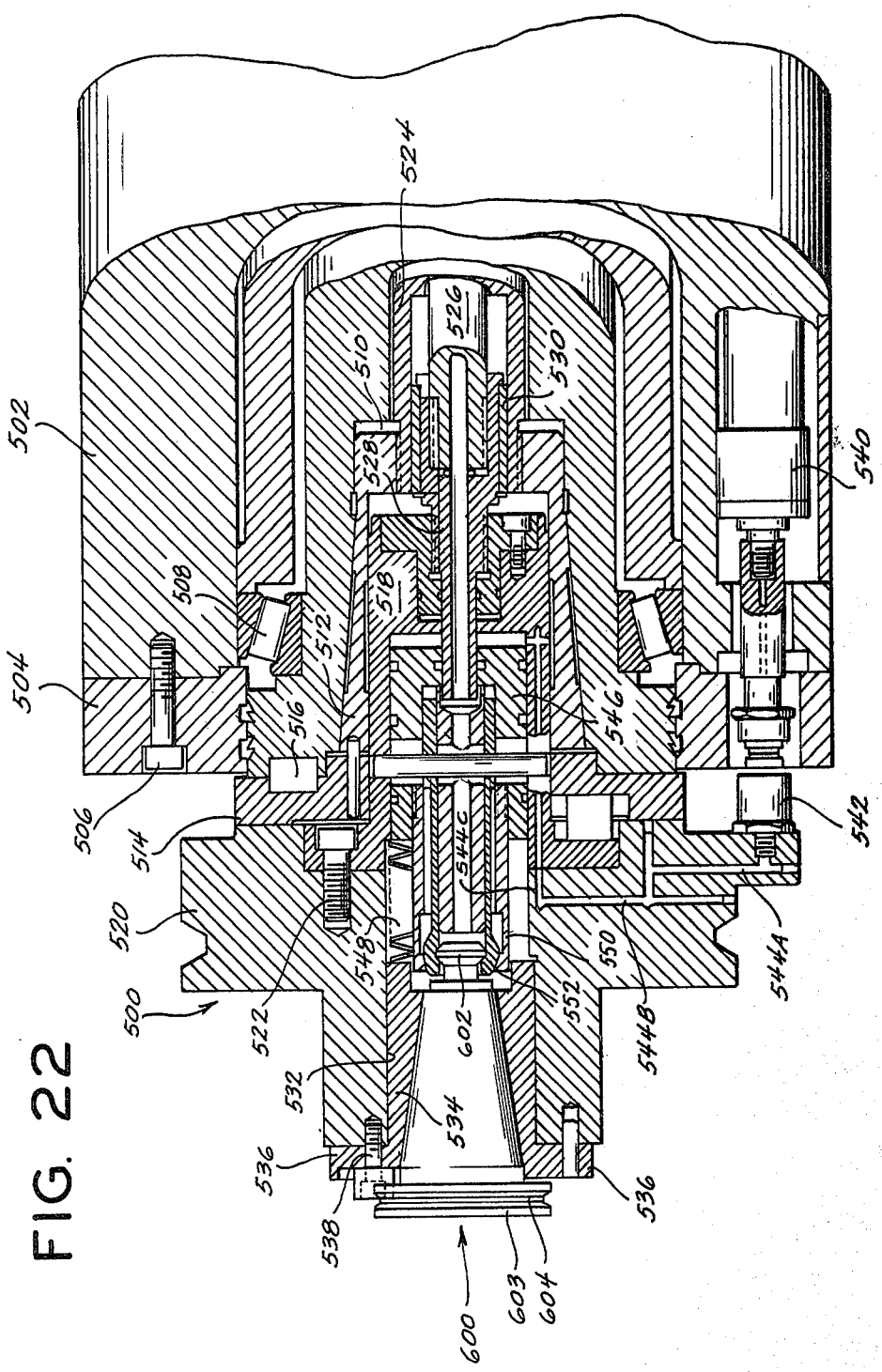
FIG. 22 is a view in longitudinal section of the spindle of the machine tool, and showing the adapter which receives one small tool mounted on the machine tool spindle for rotation therewith.

Referring to FIG. 22, there is shown the adapter member 500 in assembled relation to machine tool spindle 82. Adapter 500, as seen in FIG. 22, receives the small tool 600 from indexable carrier or auxiliary tool storage magazine 400. The spindle assembly comprises a cylindrical stationary housing 502 for the rotatable spindle 82. A spindle bearing retainer 504 is secured to stationary spindle housing 502 by bolts 506. A roller bearing assembly 508 is interposed between the rotatable spindle 82 and stationary housing 502. The outer or left-hand end of spindle 82 is provided with a socket 510 which receives a collet member 512. Spindle 82 is provided with a face plate 514 which is bolted to the spindle by bolt members (not shown). Face plate 514 is keyed to spindle 82 as indicated at 516. The purpose of key 516 between spindle 82 and face plate 514 is to relieve shearing stress on the bolts which secure the face plate to the spindle. Another function of the key 516 is to insure proper orientation of the tool, such as the adapter member 500, which is secured to the spindle. The adapter 500, as in the case of any other tool which might be received by spindle 82, is provided with a large diameter shank 518, such as a four inch diameter shank for example. Large diameter shank 518 is received by collet 512 in socket 510 at the left-hand end of spindle 82. Shank 518 of adapter 500 is suitably secured to adapter body 520 by bolts 522. A drawrod 524 is in threaded engagement with collet 512. Drawrod 524 is pulled to the right relative to the view in FIG. 22 by a suitable piston and cylinder mechanism (not shown) to thereby cause collet member 512 attached thereto to tightly grip shank 518 of the tool, such as adapter member 500, received by spindle 82. When collet 512 is moved into clamping and gripping engagement to adapter shank 518, it not only grips the adapter shank, but also centers the adapter shank relative to the axis of spindle 82.

To supplement the action of the drawrod 524 just described, a second drawrod or tool retention rod 526 is threaded and keyed to an adapter member 528 which, in turn, is threaded ito a second adapter member 530, which is secured to tool shank 518. Adapter 530, in effect, is an integral part of tool shank 518. Thus, it can be seen that by pulling to the right (relative to FIG. 22) on tool retention drawrod 526, adapter 500 is pulled up tight against the face plate 514 of spindle 82.

Adapter 500 is provided with a cylindrical passage 532 therethrough, and in the left-hand end of this passage with respect to the view of FIG. 22, a taper adapter member 534 is positioned and is provided with a peripheral flange 536 which is bolted to the forward end of adapter 500 by bolts 538. A small tool 600 received from auxiliary tool storage magazine 400 is shown positioned in taper adapter 534.

The following procedure is followed to install the tapered shank tool 600 in taper adapter 534:

(1) The hydraulic piston-cylinder assembly 540 (FIG. 22) is actuated to couple the previously uncoupled quick-disconnect member 542 to permit flow of hydraulic fluid from a stationary supply source through passages 544A, 544B and 544C to the back of piston member 546. The oil or other hydraulic fluid introduced in back of piston member 546 causes piston member 546 to move to the left relative to the view in FIG. 22 against the biasing force of Belleville springs 548. Movement of the piston member 546 to the left relative to the view of FIG. 22 moves collet clamp member 550 to the left to an unclamped position relative to collet 552. Collet clamp 550 is attached to and moves with piston member 546. When collet clamp 550 has been moved to the left to the unclamped position as just described by the movement of piston 546, the flexible collet member 552 expands radially outwardly into recess 550A of the collet clamp 550. With the collet 552 expanded radially outwardly to an open position as just described, tapered shank tool 600 may then be inserted into taper adapter 534 until neck 602 at the inner end of the taper shank tool 600 is received by collet 552. When tapered shank tool 600 has thus been installed in position, the hydraulic fluid is released from behind piston member 546 by opening a suitable valve to dump the hydraulic fluid to sump. Belleville springs 548 will then force piston member 546 to the right relative to the view of FIG. 22, pulling collet clamp member 550 to the right to the position shown in the view of FIG. 22 in which collet clamp 550 is in clamping engagement relative to tool retention collet 552 to thereby secure tapered shank tool 600 securely in position in taper adapter 534.

As just explained, hydraulic fluid is applied against piston 546 to cause movement of collet clamp 550 to permit opening up of collet 552 to either receive a taper shank tool 600 which is to be inserted in taper adapter 534 or to release a taper shank tool 600 which is already in place in taper adapter 534. After removing a given taper shank tool 600 from the taper adapter 534 with collet clamp 550 in unclamped position, piston 546 is permitted to remain hydraulically pressurized so that collet 552 will be in proper unclamped condition to receive the next "small" tool to be inserted into taper adapter 534.

The horizontal machining center and tool change mechanism hereinbefore described essentially has two different modes of operation which may be briefly summarized as follows:

Mode I: In this mode of operation, the only tools used by the machine tool spindle 82 are the "large" tools (as hereinbefore defined) having the predetermined diameter or size corresponding to the socket size of the main tool storage magazine 90, to the socket size of tilt device 92, and to the socket size of spindle 82 without using adapter 500.

Mode II: In this mode of operation, the indexable rotary carrier of auxiliary tool storage magazine 400 (FIGS. 12–16, inclusive) is mounted on tilt device 92 and "small" tools 600 from auxiliary tool storage magazine 400 are transferred by tool change assembly 96B to adapter 500 in machine tool spindle 82.

An illustrative tool change cycle in accordance with Mode I will now be described, assuming that the following initial conditions prevail:

(A) Tool No. 1 having a shank of said predetermined diameter is clamped in spindle 82 and is being used to machine a workpiece 86 (FIG. 2) on worktable 88.

(B) The empty tool socket 100 for tool No. 1 is at the tool transfer position in the upper deck of main tool storage magazine 90.

(C) The next tool to be used, tool No. 2, also having a shank of said predetermined diameter, is in a socket 100 in the upper deck of main tool storage magazine 90 in a known position.

(D) Tilt unit 92 is empty and is in the vertical position shown in FIG. 16. This is the normal position of tilt unit 92 except when small tools are being interchanged between rotary carrier 400 and spindle 82 during a portion of Mode II operation to be described later.

(E) Tool change arm 174 of first tool change arm assembly 94 is in the central position opposite the lower deck of main tool storage magazine 90.

(F) Tool change arm 96A between tilt unit 92 and spindle 82 is empty on both ends and is in the vertical rear position.

Under the foregoing initial conditions, the tool change cycle operating in accordance with Mode I will proceed as follows:

(1) While workpiece 86 is being machined, the motor which drives the upper deck of main tool storage magazine 90 is energized in the forward direction to move tool sockets 100 past the tool transfer position shown at point 478 in FIG. 2.

(2) The number of times that lugs carried by idler sprocket 136 (FIGS. 2 and 3) pass over a proximity switch along the path of movement of the lugs and are counted by a conventional counter determines when the known position of the tool socket 100 containing the desired tool No. 2 is at tool transfer point 478.

(3) When the desired tool No. 2 is at tool transfer point 478, the drive motor for the upper deck of main tool storage magazine 80 is deenergized and the desired tool socket 100 containing tool No. 2 is caused to be located at tool transfer point 478.

(4) Hydraulic piston and cylinder mechanism 258 (FIGS. 10 and 11) is extended to raise tool change arm 174 of the first tool change arm assembly 94 to the level of the upper deck of main tool storage magazine 90.

(5) Hydraulic piston and cylinder mechanism 202 (FIG. 4) is extended to move tool change arm 174 to tool transfer point 478. This places tool cavity 220 (FIG. 4) around the V-groove of tool No. 2.

(6) Hydraulic piston and cylinder mechanism 228 (FIG. 4) is retracted to move gripper jaw 224 into contact with the V-groove of tool No. 2 to clamp it to arm 174.

(7) Hydraulic piston and cylinder mechanism 256 (FIGS. 10 and 11) is extended to lift tool No. 2 out of tool socket 100.

(8) Hydraulic piston and cylinder mechanism 308 (FIG. 12) is extended to open collet clamp 292 in tilt unit 92.

(9) Hydraulic piston and cylinder mechanism 202 (FIG. 4) is retracted to swing tool No. 2 over tilt socket 290 of tilt unit 92.

(10) Hydraulic piston and cylinder mechanism 256 (FIG. 10) is retracted to lower tool No. 2 into tilt socket 290 of tilt unit 92.

(11) Hydraulic piston and cylinder mechanism 228 (FIG. 4) is extended to release gripper jaw 224 from tool No. 2.

(12) Hydraulic piston and cylinder mechanism 308 (FIG. 12) is retracted to permit Belleville springs 306 to close collet clamp 292 of tilt unit 92.

(13) Hydraulic piston and cylinder mechanism 194 (FIG. 4) is retracted to swing tool change arm 174 to its forward position indicated at dotted line 174A in FIG. 4.

(14) Hydraulic piston and cylinder mechanisms 284 (FIGS. 12, 13 and 14) are extended to swing tilt socket 274 of tilt device 92 and tool No. 2 therein to a horizontal position.

The foregoing steps 1 through 14 or any desired portion thereof can be performed while workpiece 86 (FIG. 2) is being machined by tool No. 1 which was placed in spindle 82 during the preceding tool change. Step 15, however, cannot be performed until the current machining operation on workpiece 86 is completed.

(15) The X, Y and Z axes drives for the machine tool are actuated to bring spindle 82 into the tool change position shown in FIGS. 1 and 2, and rotation of spindle 82 is stopped.

(16) Hydraulic piston and cylinder mechanism 380 (FIG. 21) is extended to rotate tool change arm 298 of tool change assembly 96A of 90° from the vertical to the horizontal position.

(17) Hydraulic rotary actuator 377 (FIG. 21) is rotated counterclockwise 90° to lock cam 360 (FIGS. 19 and 20) against tool grip jaws 350 and 352.

(18) Drawrod 524 is pushed to the left relative to the view in FIG. 22 by a suitable hydraulic piston and cylinder arrangement to thereby release collet member 512 from the shank of tool No. 1. Also, tool retention rod 526 is pushed to the left relative to the view in FIG. 22 by a suitable piston and cylinder mechanism to release tool No. 1 from its engagement with the face plate 514 of spindle 82. Tool retention rod 526 and adapter member 528 secured thereto (FIG. 22) are then rotated by a suitable means (not shown) carried by the stationary structure to cause adapter member 528 to become disengaged from its screw-threaded engagement with an adapter member such as adapter member 530 (FIG. 22) which is secured to the shank of tool No. 1. This disconnects tool retention rod 526 from tool No. 1.

(19) Piston and cylinder mechanism 308 (FIG. 12) is extended to open collet clamp 292 in tilt unit 92.

(20) Piston and cylinder mechanism 363 (FIG. 21) is retracted to pull tool No. 1 out of spindle 82 and to pull tool No. 2 out of tilt socket 290 of tilt device 92.

(21) Piston and cylinder mechanism 385 (FIG. 21) is extended to rotate tool change arm 298 of tool change assembly 96A by 180° to interchange tool No. 1 and tool No. 2.

(22) Piston and cylinder mechanism 363 (FIG. 21) is extended to insert tool No. 2 into spindle 82 and to insert tool No. 1 into tilt socket 290 of tilt device 92.

(23) Hydraulic rotary actuator 377 (FIG. 21) is rotated clockwise 90° to unlock cam 360 (FIGS. 19 and 20) from tool grip jaws 350 and 352.

(24) Drawrod 524 (FIG. 22) is pulled to the right relative to the view in FIG. 22 by a suitable hydraulic piston and cylinder mechanism to thereby cause collet member 512 to grip the shank of tool No. 2 which is now in the socket of spindle 82. Tool retention rod 526 and adapter member 528 secured thereto are rotated by a suitable means (not shown) carried by the stationary structure to cause adapter member 528 to threadedly engage an adapter member such as adapter member 530 (FIG. 22) which is secured to the shank of tool No. 22. Tool retention rod 526 is then pulled to the right relative to the view in FIG. 22 by a suitable piston and cylinder mechanism to pull tool No. 2 up tight against face plate 514 of spindle 82.

(25) Hydraulic piston and cylinder mechanism 308 (FIG. 12) is retracted to permit Belleville springs 306 to close collet clamp 292 in tilt unit 92.

(26) Piston and cylinder mechanism 380 (FIG. 21) is retracted to rotate tool change arm 298 of tool change assembly 96A from the horizontal to the vertical position. After this step, machining of the workpiece can begin again with the new tool. (27) Piston and cylinder mechanisms 284 (FIG. 12) are retracted to tilt tool No. 1 in tilt socket 274 of tilt device 92 to the vertical position.

(28) Piston and cylinder mechanism 194 (FIG. 4) is extended to swing tool change arm 174 over tilt socket 290 of tilt unit 92.

(29) Piston and cylinder mechanism 228 (FIG. 4) is retracted to move gripper jaw 224 into contact with tool No. 1.

(30) Hydraulic piston and cylinder mechanism 308 (FIG. 12) is extended to open collet clamp 292 in socket 290 of tilt unit 92.

(31) Piston and cylinder mechanisms 256 and 258 (FIGS. 10 and 11) are both extended to raise tool No. 1 above the level of the upper deck of main tool storage magazine 90.

(32) Piston and cylinder mechanism 202 (FIG. 4) is extended to move tool No. 1 to tool transfer position 478 (FIGS. 2 and 4).

(33) Piston and cylinder mechanism 256 (FIGS. 10 and 11) is retracted to drop tool No. 1 into tool socket 100 of main tool storage magazine 90.

(34) Piston and cylinder mechanism 228 (FIG. 4) is extended to move gripper jaw 224 out of contact with tool No. 1.

(35) Piston and cylinder mechanism 202 (FIG. 10) is retracted to move tool change arm 174 to its central position.

This completes the tool change cycle for tools No. 1 and No. 2 involved in Mode I operation.

The following is a description of the Mode II operation in accordance with which the rotary carrier or auxiliary tool storage magazine 400 (FIGS. 12-16, inclusive,) is mounted on tilt device 92 and "small" tools 600 from auxiliary tool storage magazine 400 are transferred to machine tool spindle 82 which is provided for this Mode of operation with an adapter member 500 (FIG. 22). As previously described, adapter 500 is provided with a special tool retention mechanism for retaining a single "small" tool 600 used in Mode II operation.

In certain respects, the various tool handling operations which are performed in the Mode II operation are the same as or similar to corresponding operations in Mode I operation. To that extent, the operations in Mode II operation which are similar to corresponding steps in Mode I operation will not be described again in any detail.

In describing the Mode II operation, it will be assumed, for simplicity of description, that spindle 82 does not have a tool of any kind therein at the beginning of the tool change cycle for Mode II operation. It will also be assumed that tilt unit 92 is empty and is in the vertical position of FIG. 16 corresponding to Mode I operation. It will also be assumed that tool change arm assembly 96B, which is used for transferring "small" tools between tilt unit 92 and spindle 82, is empty on both ends and is in the vertical rear position (i.e., the full line position in FIG. 21).

It is inherent in Mode II operation that the first "tool" to be transferred out of main tool storage magazine 90 is the adapter member 500 (FIG. 22) and that the second "tool" to be transferred out of main tool storage magazine 90 is a carrier member or auxiliary tool storage magazine 400 (FIGS. 12-16, inclusive,) having a predetermined assortment of "small" tools (such as #50 taper shank tools) positioned thereon. The adapter member 500 and the auxiliary tool storage magazine 400 which may be one of a plurality of auxiliary tool storage magazines 400 having different assortments of "small" tools are in two different predetermined sockets in the upper deck of main tool storage magazine 90 in two known positions.

Adapter unit 500 which is to be mounted on spindle 82 is transferred from the upper deck of main tool storage magazine 90 to the socket of spindle 82 by a series of steps substantially corresponding to the steps 1–24, inclusive, described in Mode I operation in describing the transfer of "tool No. 2" in Mode I operation from the upper deck of main tool storage magazine 90 to the spindle 82, since adapter 500 is merely another "large" tool having a cylindrical shank of said predetermined diameter, such as a four inch diameter shank. Substantially, the only different between steps 1–24, inclusive, of Mode I operation hereinbefore described and the corresponding steps used for transferring adapter unit 500 from the upper deck of main tool storage magazine 90 to spindle 82 in Mode II operation is that it is assumed, in order to simplify the description of the Mode II operation, that spindle 82 is empty at the beginning of Mode II operation and hence under the assumed conditions, there is no tool No. 1 already in spindle 82 which is to be transferred back to main tool storage magazine 90 as in the description of Mode I.

With the adapter member 500 received in socket 510 of spindle 82 (FIG. 22) as just described, the following steps are followed in proceeding with Mode II operation:

(1) Drawrod 524 is pulled to the right relative to the view in FIG. 22 by a suitable piston and cylinder mechanism to cause collet 512 attached to drawrod 524 to tightly grip shank 518 of adapter member 500. When collet 512 is moved into clamping and gripping engagement to adapter shank 518, it not only grips the adapter shank but also centers the adapter shank relative to the axis of spindle 82.

(2) Tool retention rod 526 and adapter member 528 secured thereto are rotated by a suitable means (not shown) carried by the stationary structure to cause adapter member 528 to threadedly engage adapter member 530 which is secured to the shank of adapter 500. This causes tool retention rod 526 to be secured to adapter 500. Tool retention rod 526 is then pulled to the right (relative to FIG. 22) by a suitable piston and cylinder mechanism to cause adapter 500 to be pulled up tight against face plate 514 of spindle 82. The action of tool retention rod 526 supplements the action of drawrod 524.

(3) The next step is to retrieve from main storage magazine 90 a particular rotary carrier or auxiliary tool storage magazine 400 having the desired assortment of "small" tools 600 positioned thereon. There may be a plurality of rotary carriers or auxiliary tool storage magazines 400 stored in main tool storage magazine 90, the different rotary carriers 400 having different assortments of small tools thereon. Auxiliary tool storage magazine 400, as previously explained, is stored in main tool storage magazine 90 just like any other "large" tool, and is retrieved from main tool storage magazine 90 by first tool transfer assembly 94 in the same manner as previously described in connection with Mode I operation. The desired auxiliary tool storage magazine 400 which has been retrieved from main tool storage magazine 90 is transferred by tool transfer assembly 94 to socket 290 of tilt unit 92 where it is gripped by collet clamp 292 of tilt unit 92 in the same manner as previously described in connection with any other "large" tool.

(4) Tilt unit 92, with auxiliary tool storage magazine 400 positioned thereon, is moved from a vertical position to a horizontal position, all in the same manner as described in connection with Mode I operation.

(5) Piston and cylinder mechanism 390 (FIGS. 15 and 16) is moved to retracted position to move tilt device 92 in its horizontal position with auxiliary tool storage magazine 400 thereon, to the right from the position of tilt unit 92 shown in FIG. 16 to the position of the tilt unit shown in FIG. 15 in which small tools 600 carried by auxiliary tool storage magazine 400 are at a proper radial distance from the axis of rotation R of tool change assembly 96B.

(6) Motor 318, which drives the Geneva mechanism 314, is energized and rotates Geneva drive member 315 through a sufficient number of revolutions to index socket 290 of tilt unit 92 through a desired angular rotation in order to present the particular "small" tool 600 required for a given machining operation to the tool transfer point 402 where the required small tool 600 can be engaged by tool transfer assembly 96B, which is adapted to receive and transfer "small" tools 600 between rotatable carrier or auxiliary tool storage magazine 400 and spindle 82.

(7) Piston and cylinder mechanism 371 is moved to extended position to cause tool transfer assembly 96B to rotate through an angle of 90° from a vertical position as seen in FIG. 16 to a horizontal position as seen in FIGS. 1, 2 and 15.

(8) Piston and cylinder assembly 363 (FIG. 21) is assumed to be in its extended position as seen in FIG. 21, in which tool change assembly 96B is in the rear full line position in FIG. 21 and hence, in a proper plane to engage V-groove 604 in the flange 603 of the small tool 600. Tool change assembly 96B is actuated to grip V-groove 604 of tool 600, as taught by the aforementioned U.S. Pat. No. 3,704,510 issued to Robert K. Sedgwick et al on Dec. 5, 1972.

(9) With one end of tool transfer arm 96B in gripping engagement to the predetermined desired small tool 600 on indexable tool carrier 400, piston and cylinder assembly 363 (FIG. 21) is then retracted to cause tool transfer assembly 96B to move to the left to the dotted line position shown in FIG. 21 to thereby pull the predetermined required small tool 600 out of the socket in which it had been positioned on auxiliary tool storage magazine 400.

(10) Preparatory to receiving "small" tool 600, it is necessary to open up collet member 552 which is adapted to receive neck portion 602 at the inner end of tapered shank tool 600. This is accomplished by actuating hydraulic piston-cylinder assembly 540 (FIG. 22) to couple previously uncoupled quick-disconnect member 542 to permit flow of hydraulic fluid from a stationary source of fluid supply to the back side of piston member 546, causing piston member 546 to move to the left relative to the view of FIG. 22 to move collet clamp member 550 to the left to an unclamped position relative to collet 552. This permits collet member 552 to expand radially outwardly into the recess 550A of collet clamp 550 and thus to an open position in which collet 552 is ready to receive neck 602 of tapered shank tool 600.

(11) Piston and cylinder mechanism 380 is then actuated to drive rack 378 to cause 180° movement of inner shaft 353 on which tool transfer arm assembly 96B is mounted. This causes the "small" tool 600, which is gripped by tool transfer assembly 96B, to move from being in alignment with the "small" tool receiving socket on rotary carrier 400 to being in alignment with the socket of taper adapter 534 of adapter member 500.

(12) Hydraulic piston and cylinder assembly 363 (FIG. 21) is then moved to extended position to cause tool transfer arm assembly 96B to move axially to the full line position of FIG. 22 to deposit "small" tool 600 in the socket of taper adapter 534.

(13) When tapered shank tool 600 has thus been installed in position in taper adapter 534 of adapter 500, piston and cylinder assembly 540 (FIG. 22) is actuated to uncouple quick-disconnect member 542 to thereby disconnect the cylinder 543 in which piston 546 moves from the stationary source of hydraulic fluid supply. Also, hydraulic fluid is released from behind piston member 546 by opening a suitable valve to dump the hydraulic fluid to sump. Belleville springs 548 then force piston member 546 to the right to the position shown in FIG. 22, thereby also pulling collet clamp member 550 to the position shown in FIG. 22 in which collet clamp 550 is in clamping engagement relative to tool retention collet 552, to thereby secure tapered shank tool 600 securely in position in taper adapter 534.

(14) Tool transfer arm assembly 96B is then actuated as taught by the aforementioned U.S. Pat. No. 3,704,510 issued to Robert K. Sedgwick et al on Dec. 5, 1972, to release tool transfer arm assembly 96B from clamping engagement with respect to the small tool 600.

(15) Hydraulic piston and cylinder mechanism 363 is then moved to retracted position to move tool transfer assembly 96B axially forward or to the dotted line position shown at the left of FIG. 21 in which it is axially forward of and clear of tool 600, which is now secured to adapter 500 for rotation with spindle 82.

(16) Hydraulic piston and cylinder mechanism 371 is then moved to retracted position to cause 90° rotation of tool transfer arm assembly 96B from the horizontal position to a vertical "park" postion. After this step, machining of the workpiece can begin with the new "small" tool 600.

In order to return the "small" tool 600 to the rotatable carrier 400 and to return carrier 400 and adapter 500 to main tool storage magazine 90, steps which are substantially the reverse of those just described under Mode II operation are followed, and in view of the foregoing explanation, it is believed that the necessary steps for returning the various members involved in the Mode II operation to the original positions which they occupied at the beginning of the Mode II operation will be obvious to one skilled in the art.

Figure 23:
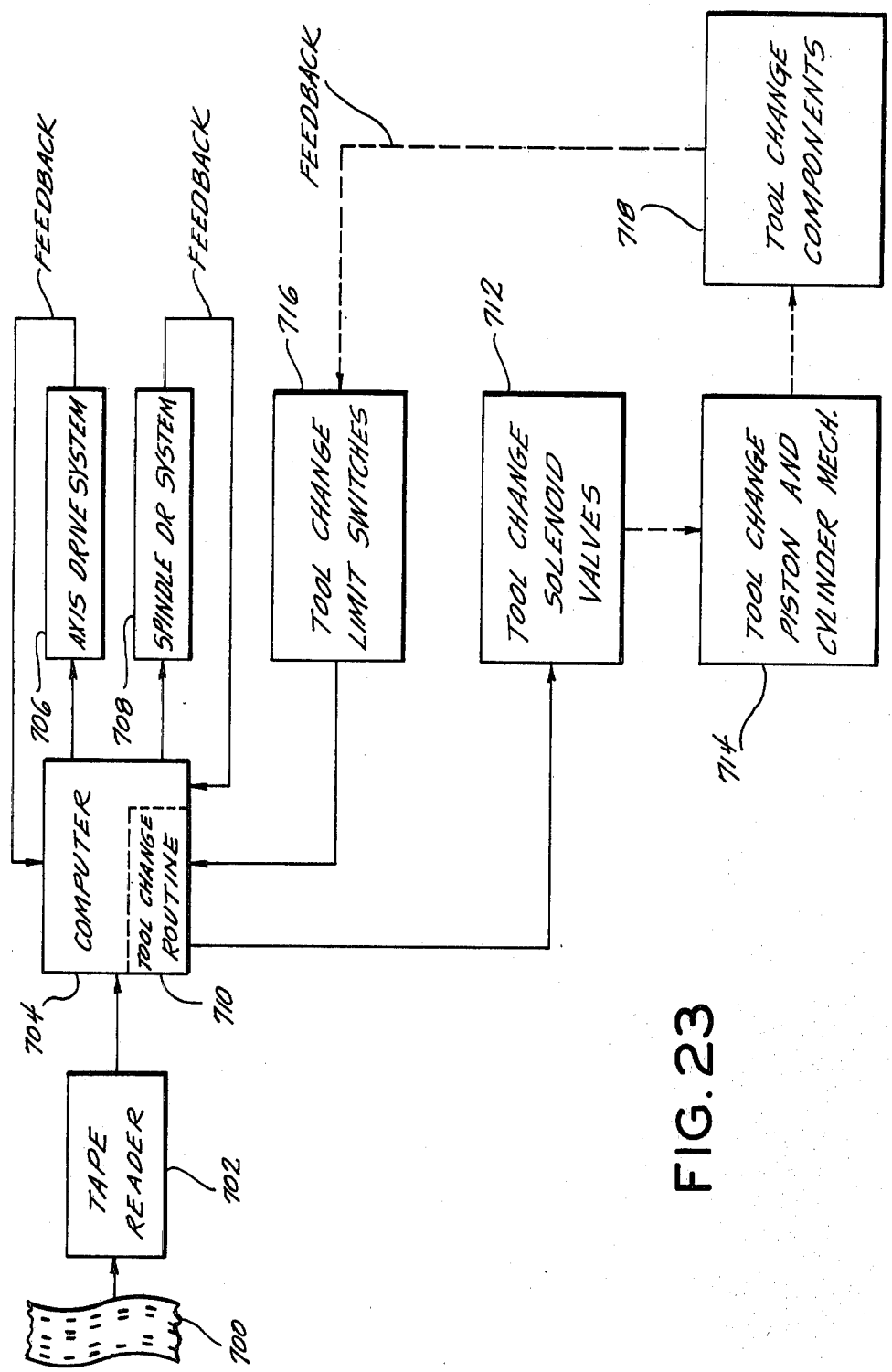
FIG. 23 is a block diagram of the electrical circuits which control the machine tool, and which also control the automatic tool changer and tool storage arrangement of the invention.

FIG. 23 is a block diagram of the electrical circuits which control the operation of the machine tool. Standard coded instruction signals are punched on a punched tape 700 and include signals indicating which tools to use, when the tools should be changed, and detailed speed and positioning instructions for spindle 82 to perform the desired machining operations, along with any other functions (such as coolant flow) which are necessary for the operation of the machine tool. The instruction signals are read off tape 700 by a tape reader 702 and are applied to a computer 704 which controls the operation of the machine tool through a conventional three axes drive system 706, a conventional spindle drive system 708, and other conventional machine tool circuits (not shown) which do not interact with the automatic tool changer of this invention.

The foregoing tool change sequences described in connection with operational Modes I and II are controlled by a suitable tool change computer routine 710 in computer 704 which controls the sequential actuation of tool change solenoid valves 712 to actuate the various tool change piston and cylinder mechanisms 714 in the foregoing described sequences. Although solenoid valves 712 are not shown individually, it will be understood by those skilled in the art that one solenoid valve is included in the circuit for each of the piston and cylinder mechanisms described herein and illustrated in FIGS. 1 through 22. Each piston and cylinder mechanism 714 is either extended or retracted in accordance with the state of the corresponding solenoid valve 712. The state of all of the solenoid valves 712 at any given time is controlled by the computerized tool change routine 710 in accordance with well-known prior art programming practice to achieve the sequences of actuation described hereinbefore.

Tool change limit switches 716 are coupled to tool change components 718 in accordance with well-known prior art electrical control practice to indicate when the desired movement of a tool change component has been completed. The electrical control portions of the machine tool are conventional with the exception of the actuation sequences of Modes I and II described hereinbefore. Accordingly, the details of the electrical control circuits are not described herein.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The embodiments of the invention in which an exclusive property or privilege is claimed are defined as follows:

1. A combined tool storage and tool change arrangement for use with a machine tool of the type which includes a power-driven rotatable spindle having a socket which receives a tool shank of a predetermined size, said tool storage arrangement comprising a main tool storage magazine for receiving and storing a plurality of tool members each having a shank of said predetermined size, said main tool storage magazine comprising:

a plurality of tool receiving sockets sized to receive a tool having a shank of said predetermined size;

means for moving said main tool storage magazine whereby to present a predetermined tool receiving socket to a first tool transfer point;

an auxiliary tool storage magazine for receiving and storing a plurality of tools, said auxiliary tool storage magazine having a shank of said predetermined size whereby said auxiliary tool storage magazine may be stored in a socket of said main tool storage magazine;

first tool transfer means for transferring said auxiliary tool storage magazine from said main tool storage magazine to a tool transfer station intermediate said main tool storage magazine and said spindle; and a second tool transfer means for transferring a predetermined tool from said auxiliary tool storage magazine to said spindle.

2. A combined tool storage and tool change arrangement as defined in claim 1 in which said auxiliary tool storage magazine has sockets for receiving tools having a shank size different than said predetermined size, and said spindle is provided with an adapter whereby to adapt said spindle to receive at a given time one of said tools having a shank size different than said predetermined size, and in which said second tool transfer means transfers from said auxiliary tool storage magazine to said adapter in said spindle a predetermined one of said tools having a shank size different than said predetermined size.

3. A combined tool storage and tool change arrangement as defined in claim 2 in which said auxiliary tool storage magazine has sockets for receiving tools having a shank size smaller than said predetermined size, and said adapter adapts said spindle to receive at a given time one of said tools having a shank size smaller than said predetermined size.

4. A combined tool storage and tool change arrangement as defined in claim 2 in which said adapter has a shank of said predetermined size whereby said adapter may be stored in a socket of said main tool storage magazine, and whereby said adapter may be received by said socket of said rotatable spindle; and
means for transferring said adapter from said main tool storage magazine to said spindle.

5. A combined tool storage and tool change arrangement as defined in claim 3 in which said adapter has a shank of said predetermined size whereby said adapter may be stored in a socket of said main tool storage magazine, and whereby said adapter may be received by said socket of said rotatable spindle;
and means for transferring said adapter from said main tool storage magazine to said spindle.

6. A combined tool storage and tool change arrangement as defined in claim 1 in which said auxiliary tool storage magazine is a rotatable carrier member;
means for supporting said rotatable carrier member for rotatable indexing movement at said tool transfer station; and
means for rotatably indexing said rotatable carrier member to present a predetermined one of said tools at said second tool transfer point.

7. The combined tool storage and tool change arrangement of claim 1 wherein said main tool storage magazine further includes means for indexing said auxiliary tool storage magazine at said main tool storage magazine to present a predetermined tool carried by said tool storage magazine to a second tool transfer point at said tool transfer station.

8. A combined tool storage and tool change arrangement for use with a machine tool of the type which includes a power-driven rotatable spindle having a socket which receives a tool shank of a predetermined size, said tool storage arrangement comprising a main tool storage magazine for receiving and storing a plurality of larger tool members each having a shank of said predetermined size, said main tool storage magazine comprising a plurality of tool receiving sockets each sized to receive a tool having a shank of said predetermined size;
means for moving said main tool storage magazine whereby to present a predetermined tool receiving socket to a first tool transfer point;
an auxiliary tool storage magazine for receiving and storing a plurality of smaller tools each having a shank of a size smaller than said predetermined size, said auxiliary tool storage magazine having a shank of said predetermined size whereby said auxiliary tool storage magazine may be stored in a socket of said main tool storage magazine;
an adapter for positioning on said spindle whereby to adapt said spindle to receive at a given time one of said smaller tools, said adapter having a shank of said predetermined size whereby said adapter may be stored in a socket of said main tool storage magazine, and whereby said adapter may be received by said socket of said rotatable spindle;
means for transferring said adapter from said main tool storage magazine to said socket of said spindle;
means for transferring said auxiliary tool storage magazine from said main tool storage magazine to a tool transfer station intermediate said main tool storage magazine and said spindle, said tool transfer station including a socket for receiving said shank of said auxiliary tool storage magazine;
means for indexing said auxiliary tool storage magazine at said tool transfer station whereby to present a predetermined smaller tool to a second tool transfer point; and
means for transferring said predetermined smaller tool from said auxiliary tool storage magazine to said adapter in said spindle.

9. A tool storage and tool change arrangement as defined in claim 8 in which said auxiliary tool storage magazine is a rotatable carrier member;
means for supporting said rotatable carrier member for rotatable indexing movement at said tool transfer station; and
means for rotatably indexing said auxiliary tool storage magazine to present a predetermined one of said smaller tools to said second tool transfer point.

10. A combined tool storage and tool change arrangement as defined in claim 8 comprising a first and a second selectively operable tool change means for transferring tools between said tool transfer station and said spindle, one of said selectively operable tool change means comprising said means for transferring said predetermined smaller tool from said auxiliary tool storage magazine to said adapter in said spindle, the other of said selectively operable tool change means comprising means for transferring a tool having a shank of said predetermined size from said tool transfer station to said spindle.

11. A combined tool storage and tool change arrangement as defined in claim 8 in which said adapter member includes a socket for receiving one of said smaller tools and retention means for retaining the tool in said socket of said adapter;
fluid operated means for releasing said retention means, said retention means and said fluid operated means being located in said socket of said adapter and being rotatable with said adapter when said spindle is rotating; and
conduit means extending into said adapter for supplying fluid to operate said fluid operated means, said conduit means including a quick disconnect connection to a stationary source of fluid supply to permit quick connection or disconnection of said fluid supply to said fluid operated means when said spindle is not rotating.

12. A tool storage arrangement for use in conjunction with an automatic tool changing mechanism for a machine tool comprising, in combination, a main tool storage magazine for receiving and storing a plurality of tools each having a shank of a predetermined size, said main tool storage magazine comprising a plurality of tool receiving sockets sized to respectively receive a tool having a shank of said predetermined size; and an auxiliary tool storage magazine for receiving and removably storing a plurality of tools, said auxiliary tool storage magazine having a shank of said predetermined size whereby said auxiliary tool storage magazine may be stored in a socket of said main tool storage magazine so that said tools or said auxiliary tool storage magazine can be extracted by a tool changer device.

13. A tool storage arrangement as defined in claim 12 in which said auxiliary tool storage magazine has sockets for receiving tools having shanks of a different size than said predetermined size.

14. In an automated tool storage and tool changing system a method of storing and changing tools for use with a machine tool having a spindle with a socket which normally receives a tool of a predetermined shank size, comprising the steps of:
(1) providing in association with said machine tool a main tool storage magazine having a plurality of tool receiving sockets each respectively sized to receive a tool shank of said predetermined size;
(2) storing in said main tool storage magazine an indexable carrier member having a shank of said predetermined size, said carrier member having a plurality of tool receiving sockets each respectively sized to receive a tool shank therein with the respective tool receiving sockets having a tool positioned therein; p1 (3) retrieving said indexable carrier member from said main tool storage magazine and transferring said indexable carrier member to a tool transfer station which is located intermediate said main tool storage magazine and said spindle;
(4) indexing said indexable carrier member at said tool transfer station to present a predetermined one of said tools carried by said indexable carrier member to a proper position for transfer to said spindle; and
(5) transferring said predetermined one of said tools to said socket of said spindle.

15. In an automated tool storage and tool changing system a method of storing and changing tools for use with a machine tool having a spindle with a socket which normally receives a tool of a predetermined shank size, comprising the steps of:
(1) providing in association with said machine tool a main tool storage magazine having a plurality of tool receiving sockets each respectively sized to receive a tool shank of said predetermined size;
(2) storing in said main tool storage magazine an adapter member having a shank of said predetermined size, said adapter member including a tool retention mechanism adapted to receive a tool shank of a size different than said predetermined size;
(3) storing in said main tool storage magazine an indexable carrier member having a shank of said predetermined size, said carrier member having a plurality of tool receiving sockets each respectively sized to receive a tool shank of a different size than said predetermined size, with said tool receiving sockets having tools with shanks of said different size positioned therein;
(4) retrieving said adapter member from said main tool storage magazine and transferring said adapter member to said socket of said spindle;
(5) retrieving said indexable carrier member from said main tool storage magazine and transferring said indexable carrier member to a tool transfer station which is located intermediate said main tool storage magazine and said spindle;
(6) indexing said indexable carrier member at said tool transfer station to present a predetermined one of said tools carried by said indexable carrier member to a proper position for transfer to said spindle; and
(7) transferring said predetermined one of said tools to said tool retention mechanism of said adapter.

16. In an automated tool storage and tool changing system, the method as defined in claim 15 in which said tools positioned in the sockets of said indexable carrier member have a shank of smaller size than said predetermined size.

* * * * *